(12) United States Patent
Gruner-Nielsen et al.

(10) Patent No.: US 8,948,559 B2
(45) Date of Patent: Feb. 3, 2015

(54) MULTIPLE LP MODE FIBER DESIGNS FOR MODE DIVISION MULTIPLEXING

(71) Applicant: OFS Fitel, LLC, Norcross, GA (US)

(72) Inventors: Lars Gruner-Nielsen, Copenhagen (DK); Robert L. Lingle, Johns Creek, GA (US); David W Peckham, Lawrenceville, GA (US); Yi Sun, Suwanee, GA (US)

(73) Assignee: OFS Fitel, LLC, Norcross, GA (US)

( * ) Notice: Subject to any disclaimer, the term of this patent is extended or adjusted under 35 U.S.C. 154(b) by 36 days.

(21) Appl. No.: 13/838,981

(22) Filed: Mar. 15, 2013

(65) Prior Publication Data

US 2014/0064686 A1     Mar. 6, 2014

Related U.S. Application Data

(60) Provisional application No. 61/696,932, filed on Sep. 5, 2012.

(51) Int. Cl.
*G02B 6/28* (2006.01)
*G02B 6/028* (2006.01)

(52) U.S. Cl.
CPC .................................. *G02B 6/0288* (2013.01)
USPC .......................................... 385/124; 385/147

(58) Field of Classification Search
USPC .................. 385/122, 123, 124, 125, 127, 129
See application file for complete search history.

(56) References Cited

U.S. PATENT DOCUMENTS

| | | | |
|---|---|---|---|
| 4,889,404 A | 12/1989 | Bhagavatula et al. | |
| 6,931,187 B2 * | 8/2005 | Kim et al. | 385/124 |
| 7,171,091 B1 * | 1/2007 | Ward | 385/125 |
| 7,400,807 B2 * | 7/2008 | Minelly et al. | 385/124 |
| 7,455,460 B2 * | 11/2008 | Pimpinella et al. | 385/55 |
| 2010/0067858 A1 | 3/2010 | Kim et al. | |
| 2011/0194827 A1 | 8/2011 | Jiang et al. | |

* cited by examiner

*Primary Examiner* — Akm Enayet Ullah

(57) ABSTRACT

The specification describes modified step index and GRaded INdex (GRIN) fibers with low core relative delta (near 0.8%) which have desirable properties for transmission. These lower delta fibers have lower attenuation losses due to reduced Rayleigh scattering, which is desirable to improve performance in multiple mode multiplexing. The fiber designs include optimized raised triangle profiles, and depressed cladding profiles, to support two and four LP modes.

9 Claims, 23 Drawing Sheets

MULTIPLE LP MODE FIBER DESIGNS FOR MODE DIVISION MULTIPLEXING

RELATED APPLICATIONS

This application claims priority from U.S. Provisional Application No. 61/696,932 filed Sep. 5, 2012, which application is owned by the assignee of this invention and is incorporated herein by reference in its entirety.

FIELD OF THE INVENTION

The invention relates to optical fibers designed for space-division multiplexing (SDM). More specifically it relates to optical fibers that efficiently transmit optical signals in multiple modes without substantial crosstalk.

BACKGROUND OF THE INVENTION (The following may or may not constitute prior art)

Previous work on multiple mode optical fibers for mode-division multiplexing focused on step and graded index (GRIN) fiber designs for optimized two LP mode fibers (having three spatial modes). We have also disclosed GRIN fiber designs with 1% core relative deltas, including a shelf and trench in the cladding, which are optimized to support four LP modes (having six spatial modes).

STATEMENT OF THE INVENTION

We have now designed GRIN fibers with lower core relative delta (near 0.8%) which have desirable properties for transmission. These lower delta fibers will have lower attenuation losses due to reduced Rayleigh scattering, which is desirable to improve performance. We have also designed fibers with optimized raised triangle, depressed cladding profiles to support two and four LP modes. Recently work on fibers designed to support space-division multiplexing (SDM) has been reported, for example see. This work has generally focused either on fibers that contain multiple cores with weak coupling between the cores or on fibers with a single core that supports the propagation of a few modes.

DETAILED DESCRIPTION

Figure 1:
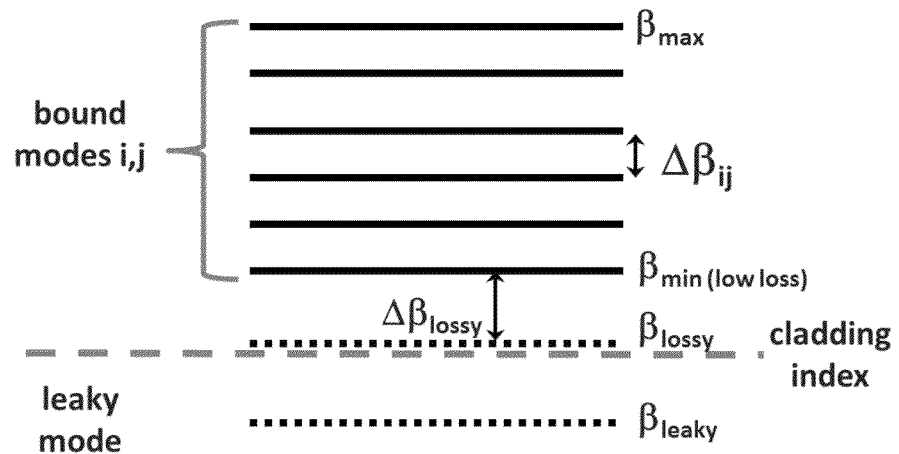
FIG. 1 is an illustrative diagram of modal propagation constants for a hypothetical step-index or graded-index FMF with no cladding structure.

Interest in SDM is mainly due to the impending "capacity crunch," in which the fundamental, non-linear Shannon limit to increasing the spectral efficiency of fiber optic transmission will force carriers to deploy fiber cables at an accelerating rate, rather than simply deploying faster transmitters at decreasing marginal cost-per bit, thus destroying the economics of the backbone network. A rich new medium with 100× to 1000× times the capacity of standard single mode fiber (SSMF) would be required. Few mode fiber (FMF) technology combined with multi-core fiber technology might create such a medium. The following portion of the specification will review the single-core FMF work, also briefly touching upon the concept of supermodes using strongly coupled multicore fiber. For use in high capacity SDM transmission it is desirable that the waveguide:

supports the low loss propagation of N unique modes, where N is at least 2 and possibly 10 to 20. Here low loss is considered to be that of conventional single mode fiber.

has low differential mode attenuation (DMA), for example less than about 0.02 dB/km. DMA is a fundamental, uncorrectable impairment that limits the capacity of transmission based on multiple-input, multiple output (MIMO) signal processing.

provides low DGD between all of the low loss modes so that the receiver design can be simplified. To support 1000 km transmission with ASIC technology that may be realizable on a 10-year timeframe, the accumulated DGD of a FMF transmission line probably needs to be equalizable with perhaps hundreds of T/2-spaced complex taps for a time domain equalizer. This represents a technological, but not a fundamental, limitation. The relationship between fiber DGD and accumulated DGD will be discussed below. In a contrary view, large DGD may have the beneficial impact of reducing non-linear crosstalk between modes.

optimizes the strength of distributed mode coupling. It has been proposed that low mode-coupling in the fiber will minimize the complexity of MIMO crosstalk mitigation hardware. In a contrary view, strong mode coupling has the benefit of minimizing the accumulation of DGD with distance as well as minimizing the impact of DMA in the fiber and mode-dependent gain in the amplifier.

provides a low level of transmission penalty caused by nonlinear propagation impairments, including maximizing the effective areas of the low loss modes.

can be cost effectively realized with state-of-the-art fiber fabrication techniques.

It will be noted that alternative suggestions have been put forward as to the most beneficial properties for FMFs. In the following portion of the specification we will discuss FMF design strategies for step index and graded index fibers and consider the inevitable tradeoffs that will be made in trying to achieve a design that meets any set of objectives. Recent fiber design and transmission experiments over few-mode fiber have been conducted with two limits in mind. In one case, it is assumed that mode coupling in an N-mode fiber will be confined to a subset of M modes where M<N. In one example of this low mode-coupling paradigm, the fiber supported five spatial modes (comprising $LP_{01}$, $LP_{11}$, and $LP_{21}$), where the only strong couplings were between $LP_{11}a$ and $LP_{11}b$ and then between $LP_{21}a$ and $LP_{21}b$. So it was only necessary to implement two 4×4 MIMO recovery algorithms instead of one 10×10 MIMO algorithm. In another paradigmatic case, it is assumed that all N fiber spatial modes mix sufficiently such that full 2N×2N MIMO recovery of the signals is necessary (where 2N accounts for two polarizations for each spatial mode). In prior work independent data streams were multiplexed onto three independent spatial modes (comprising $LP_{01}$, $LP_{11}$) and their x- and y-polarizations were then demultiplexed by a 6×6 MIMO recovery algorithm over 10 km, then 96 km, and then 1200 km. In the case of 96 km transmission, large penalties were observed for reduced complexity 4×4 MIMO demodulation of LP11a and LP11b. This is the more complex case for receiver design and implementation. In the former case, the fiber design must maintain a relatively large $\Delta\beta$ between nearest neighbor modes to reduce distributed mode coupling. In the latter case, a smaller $\Delta\beta$ between guided modes would beneficially slow the accumulation of DGD as a function of length and mitigate the effects of DMA through stronger mode mixing (within and between the low-loss modes).

In this context, it is interesting as well as important to consider that DMA, mode coupling, and maximum accumulated DGD are inter-related quantities. Consider the schematic diagram of fiber mode propagation constants in FIG. 1. (The propagation constant can be converted to effective index by $n_{eff}=\beta/k$.) Modes above the cladding index are bound modes, while those below the cladding are leaky modes. Attenuation and DMA will be strongly influenced by the macro- and microbending losses of the modes. Macrobending loss is generally minimized by maximizing $\beta$ (or equivalently the effective index $n_{eff}$); keeping $\beta_{min}$ above some minimum level is critical for minimizing loss in SSMF and DMA in FMF. SSMF is generally designed so that there is a highly lossy, though technically still bound, mode just above the cladding index; that mode is said to be effectively cutoff through the high loss. The same principle will hold for step-index or graded-index FMF with no cladding structure: an optimized design would have a mode just above the cladding index as shown as a dashed line in FIG. 1. In the case of a structured cladding, the lossy mode may drop below the cladding index and become a leaky mode. It is difficult in practice to engineer the modal spacings such that $\Delta\beta_{lossy} >> \Delta\beta_{ij}$.

The strength of coupling between bound modes which carry signals and the lossy or leaky modes are governed by Eq. 11.5, leading to microbending loss in the presence of cable stress. Microbending loss for the lowest bound mode is a strong function of $\Delta\beta_{lossy}$, so maximizing $\Delta\beta_{lossy}$ is also a condition for minimizing DMA. In an ideal case for the strong mode-mixing paradigm, all $\Delta\beta_{ij}$ would be small, $\beta_{min}$ would be relatively large, and $\Delta\beta_{\lambda\text{oow}} >> \Delta\beta_{ij}$. This would result in a fiber where modes couple strongly in pairwise fashion leading to 1) accumulation of DGD which is proportional to the square root of the fiber length (see Eq. 11.7) even over shorter links of a few hundred km and 2) mitigation of the deleterious impact of DMA. Furthermore macro- and microbending of the lowest guide mode would be small, leading to low DMA. In fact, these are difficult conditions to fulfill. It is typical that the spacing between adjacent modes does not vary strongly over a few modes, and there is typically no abrupt change in mode spacing across the cladding index. In other words, it is challenging to design a fiber to promote mixing between multiple low loss bound modes while simultaneously minimizing the loss of the lowest bound mode.

Since low DMA is a fundamental requirement, we conclude that $\beta_{min}$ must be kept greater than some threshold for low macrobending and $\Delta\beta_{lossy}$ (typically similar to $\Delta\beta_{ij}$) must be kept large enough to minimize microbending loss. Once these two criteria are fulfilled, there will typically be little flexibility to manipulate the magnitude of $\Delta\beta_{ij}$.

Figure 2:
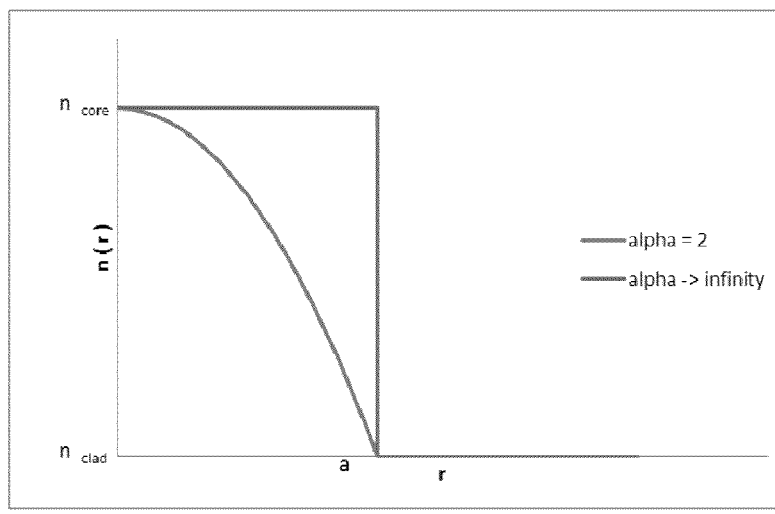
FIG. 2 illustrates the index of refraction for step index ($\alpha=\infty$) and parabolic ($\alpha=2$) core shapes.

Consider a circularly symmetric optical fiber with cladding of infinite radial extent and radially varying index of refraction as shown in FIG. 2. The index of the cladding is given by $n_{clad}$ and the index of the core at r=0 is $n_{core}$. The index within the core, n(r), at radial position r is given by $$n(r) = n_{clad} + n_{core} * \left[1 - \left(\frac{r}{a}\right)^\alpha\right] \text{ for } r \leq a \quad (1)$$

where a is the core radius, $\alpha$ is the core shape parameter. The ideal step index core shape occurs when $\alpha$ becomes infinite.

It can be shown that the effective index, $\beta/k$, of a mode guided by this waveguide structure must satisfy the inequality $$n_{clad} < \beta/k < n_{core} \quad (2)$$

where $\beta$ is the propagation constant of the mode and $k=2\pi/\lambda$ is the propagation constant of a plane wave in free space. When the effective index is greater than the cladding index the solutions for the transverse fields in the cladding region are radially evanescent and therefore the modal energy is confined within the waveguide structure and the mode is referred to as a guided mode. A mode is said to be cutoff when its effective index is equal to the cladding index since the solutions for the transverse fields in the cladding is oscillatory, rather than evanescent, and energy is carried away from the fiber axis. In general it is desirable for a mode to have effective index far above the cladding index since this results in rapid decay of the evanescent field in the cladding, and it being less susceptible to bending losses.

When the weakly guiding assumption holds, i.e., when $(n_{core}-n_{clad})/n_{clad} \ll 1$, then the waveguide properties can be accurately approximated by linearly polarized modes that have no longitudinal field components, i.e., the polarization is in the plane transverse to the fiber axis. The fields and characteristic equation of the linearly polarized modes can be described by simple analytic formulas that simplify calculation of the waveguide properties. The properties of the LP modes are a good approximation of those of the real modes of weakly guiding fibers over a wide range of conditions. For these reasons, the LP mode analysis is often used when considering typical optical fibers used in optical communications systems. The LP modes correspond to degenerate groups of the HE, TE and TM modes given by the more general analysis that does not make use of the weakly guiding approximation. For the LP modes with no azimuthal variation of the fields, i.e., the azimuthal mode number is zero, the LP modes are comprised of two degenerate modes; the two polarizations of the $HE_{1x}$ modes. For the LP modes with azimuthal variation of the fields, i.e., the azimuthal mode number is greater than zero, then the LP modes are comprised of four nearly degenerate modes; a set of HE, EH, TE and TM modes. The $LP_{lm}$ nomenclature is generally used to name the individual linearly polarized modes. Here the azimuthal and radial mode-numbers are given by l and m, respectively. The lowest order $LP_{01}$ mode is often referred to as the fundamental mode and corresponds to the two polarizations of the $HE_{11}$ mode. The first higher-order mode, the $LP_{11}$ mode, is comprised of the two polarizations of the $HE_{21}$ mode and the $TM_{01}$ and $TE_{01}$ modes, i.e., four nearly degenerate "real" modes.

The normalized frequency of a step index fiber is defined as $$V = ka(n_{core}^2 - n_{clad}^2)^{1/2} \approx kn_{core} a\sqrt{2\Delta} \quad (3)$$

where $\Delta = (n_{core} - n_{clad})/n_{clad}$. The normalized frequency is sometimes referred to as the waveguide strength because any given guided mode will be better confined to the core, i.e more strongly guided, when the waveguide has a larger value of V.

Figure 3:
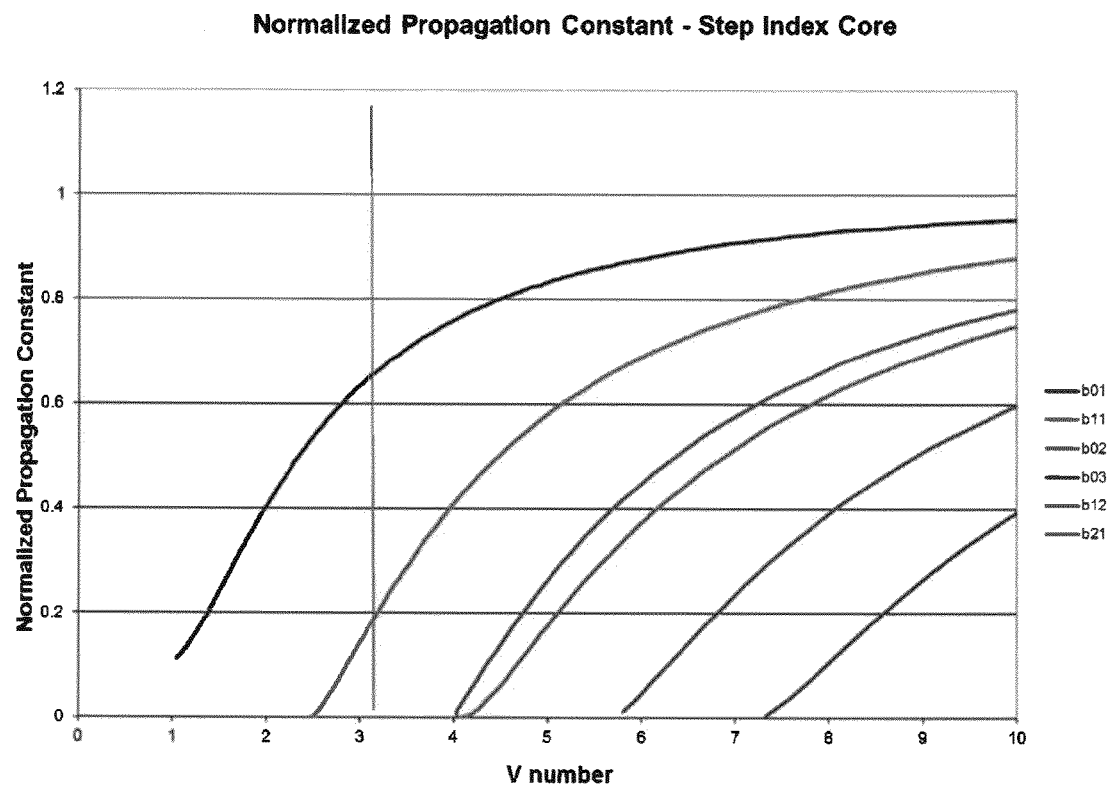
FIG. 3 shows Normalized Propagation Constant, $b_{lm}$, as a function of V for $LP_{lm}$ modes of a step index fiber. Vertical red line is located at V=3.15 where the DGD between the LP11 and LP02 modes is zero.

FIG. 3 shows the normalized propagation constant of the guided $LP_{lm}$ modes of a step index fiber as a function of the normalized frequency, V. The normalized propagation constant of the ij mode, $b_{ij}$, is defined as $$b_{ij} = \frac{\left(\frac{\beta_{ij}}{k} - n_{clad}\right)}{(n_{core} - n_{clad})} \quad (4)$$

when V is less than 2.405, then only the fundamental $LP_{01}$ satisfies the condition that the effective index is greater than $n_{clad}$ and therefore the fiber is single-moded. When V is greater than 2.405 then additional modes satisfy the propagation condition and the fiber supports the propagation of more than one LP mode.

When designing the index profile of a single mode fiber it is usual to place the V value slightly greater than 2.405 at the shortest operating wavelength, say V~2.8. Even though the fiber can theoretically support the propagation of the $LP_{11}$ mode, the effective index of the $LP_{11}$ mode is very low and the loosely bound $LP_{11}$ mode is susceptible to excess loss caused by bending and waveguide imperfections. With a fiber of this design under practical deployment conditions, the $LP_{11}$ is effectively cutoff because of the excess losses that result from bending. This design trick of operating the waveguide at V-number slightly above the cutoff V-number results in a "stronger waveguide" and therefore the fundamental mode has better mode confinement and lower susceptibility to bending loss than would be otherwise possible. This same design approach can be used when designing FMFs.

As noted previously, it is desirable for FMFs to have low mode coupling between the modes that will be used for SDM multiplexing to minimize the crosstalk between the multiplexed data streams. An additional requirement is that the highest order mode used in the SDM scheme have low mode coupling to even higher order guided, leaky or radiation modes since energy coupled to these modes results in energy loss.

The field shapes of the guided modes of an ideal fiber satisfy an orthogonality condition and therefore energy does not couple between the modes. However, in a real fiber the orthogonality can be broken by imperfections in the fiber, e.g. inhomogeneities of the index of refraction or deformations of the fiber axis or core size, core noncircularity, etc.; which can result in the coupling of energy between the modes. Imperfections in the transmission path or coupling points can cause optical modes to exchange power. This issue can be addressed with MIMO signal processing, but for a good understanding of the FMF properties, one must have a grasp of the potential and implications of mode coupling. For degenerate modes (such as the two polarizations of the $LP_{01}$ which have identical phase constants) the mode coupling is usually strong; that is a substantial optical power will be transferred between the modes within a few tens of meters. In the case of other modes ($LP_{11}$ to $LP_{01}$ for example) the coupling can be much weaker, and depends on the relative difference in phase constants. In such a case, the optical signal may travel tens of kilometers before there is significant coupling to another mode. Different FMF design strategies can result in either strong or weak mode coupling. Prior work found that energy will couple between two modes when the imperfections have a longitudinal spatial frequency component equal to the difference in the longitudinal propagation constants of the modes, $\Delta\beta$. The strength of the coupling between two modes is a strong function of $\Delta\beta$. Coupling between modes of adjacent mode groups is proportional to $$(\Delta\beta)^{-(4+2p)} \quad (5)$$

where p characterizes the power spectrum of the perturbation and typically has values of 0, 1 or 2 depending on the nature of the external stresses, the fiber outer diameter, and coating properties. This result implies that to minimize mode coupling we must maximize the $\Delta\beta$ of the modes.

From FIG. 3 one can see for a step index 2-mode fiber with V equal to about 4 that $\Delta\beta$ between the $LP_{01}$ and $LP_{11}$ modes and $\Delta\beta$ between the $LP_{11}$ and the $LP_{21}$ modes are simultaneously maximized. This condition results in low mode coupling between the $LP_{01}$ and $LP_{11}$ modes that are used for SDM and low mode coupling between the $LP_{11}$ and the lossy $LP_{21}$ mode. Similarly, for a 4-mode step-index fiber that supports propagation of the $LP_{01}$, $LP_{11}$, $LP_{21}$ and $LP_{02}$ modes, the mode coupling between the 4 modes will be minimum when the V~5.5. However, the coupling between $LP_{21}$ and $LP_{02}$ will always be relatively much stronger than coupling between other pairs of modes.

Figure 4:
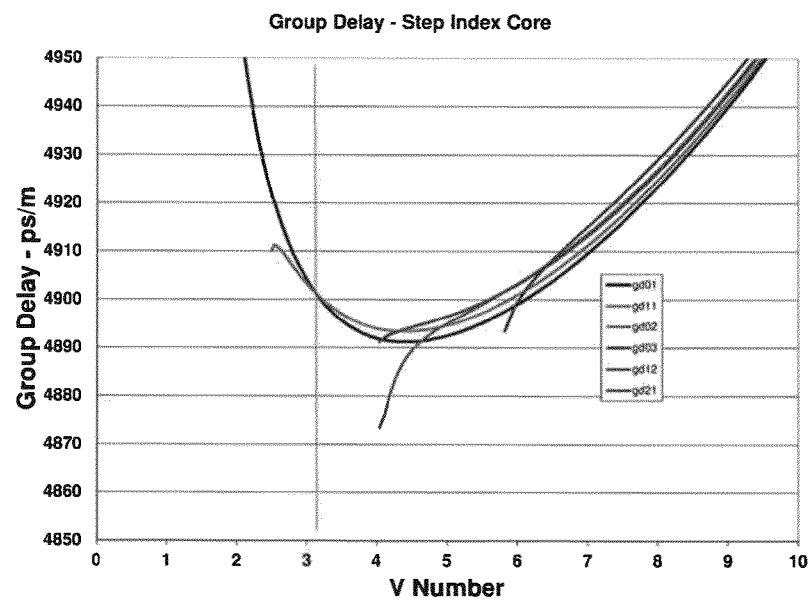
FIG. 4 shows group delay as a function of V for the first 6 $LP_{lm}$ modes of a step index fiber.

When the group velocities of the modes that carry independent SDM data channels are different, then pulses that are simultaneously launched into the various modes of the fiber will arrive at the end of the fiber at different times. When mode coupling and DGD are both present then crosstalk between modes can spread across multiple bit periods. The MIMO signal processing electronics that address channel crosstalk in the SDM receiver hardware become more complex when the accumulated DGD between the modes grows and the crosstalk spreads over many bit periods. Therefore for long distance SDM transmission it is desirable to minimize the DGD. FIG. 4 plots the normalized group delay as a function of V for various modes of a step index fiber. FIG. 4 shows that the group delay curves of the $LP_{01}$ and the $LP_{11}$ modes cross and the DGD becomes zero when V is approximately equal to 3.15. Note that we found in the previous section that the $\Delta\beta$'s of a 2-mode step-index fiber are maximized when V~4. So for 2-mode step-index fibers it is not possible to simultaneously minimize both DGD and mode coupling. For a 4-mode fiber, FIG. 3 4 shows that a step-index design does not exist where the group delay between all of the lowest order 4-modes is zero. Note that for step index fibers there are values of V where the group delays of a subset of the guided modes are equalized. For example the group delay of the $LP_{02}$, $LP_{21}$ and $LP_{12}$ modes are approximately equal when V is equal to about 6.5. However, when V~6.5 the fiber supports three more modes with quite different group delays.

In FIG. 4 the vertical line is located at V=3.15 where the DGD between the $LP_{01}$ and $LP_{11}$ modes is zero. However, when V=3.15 the normalized propagation constant of the $LP_{11}$ mode is very small and coupling between the $LP_{11}$ mode and leaky modes will be large resulting in DMA. When V~4.5, the normalized propagation constants and the difference between the propagation constants of the $LP_{01}$ and $LP_{11}$ are large which gives low sensitivity to mode coupling between the $LP_{01}$ and $LP_{11}$ modes and between the $LP_{11}$ mode and leaky modes. Further, the propagation constant of the $LP_{02}$ and $LP_{21}$ modes are very small so that these modes will be very lossy and therefore only the two lowest order modes propagate with low loss. However, the $LP_{01}$ and $LP_{11}$ mode DGD is quite large when V~4.5. In addition to the magnitude of the $\Delta\beta$ of the fiber profile design, mode coupling also depends on factors related to the deployment of the fiber. Here cabling and splicing effects need to be considered. Cabling stress will increase distributed mode coupling by providing an additional source of perturbations of the fiber. Splices and connectors provide points of discrete mode coupling.

When small and random mode coupling is considered, it can be shown that the DGD will grow linearly with length for distances much shorter than the correlation length and as the square root of length for long lengths. The two-mode case is completely analogous to the results obtained for PMD. If a short pulse is launched simultaneously in each mode then the variance in arrival times of portions of the pulse is given as a function of fiber length, L:

$$\langle (T - \langle T \rangle_{av})^2 \rangle_{av} = \frac{DGD^2 l_c L}{4}\left[1 - \frac{l_c}{2L}(1 - \exp(-2L/l_c))\right] \quad (6)$$

$$\lim_{L/l_c \to \infty} \langle (T - \langle T \rangle_{av})^2 \rangle_{av} = \frac{DGD^2 l_c L}{4} \quad (7)$$

where $l_c$ is the correlation length and T is the time-of-flight through the fiber. Note from the second equation (long fiber limit) that the spread in arrival times scales as the square root of the product of the correlation length and the fiber length. A similar scaling law holds for guides with any number of modes.

Figure 5:
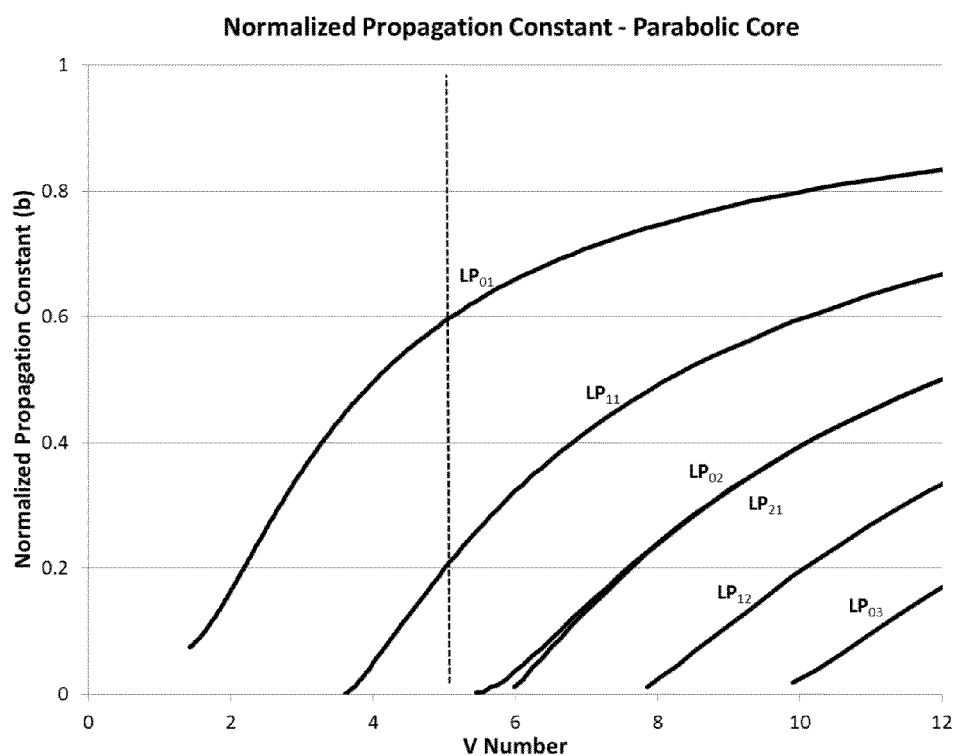
FIG. 5 shows normalized propagation constants for the first 6 modes of a parabolic core.
Figure 6:
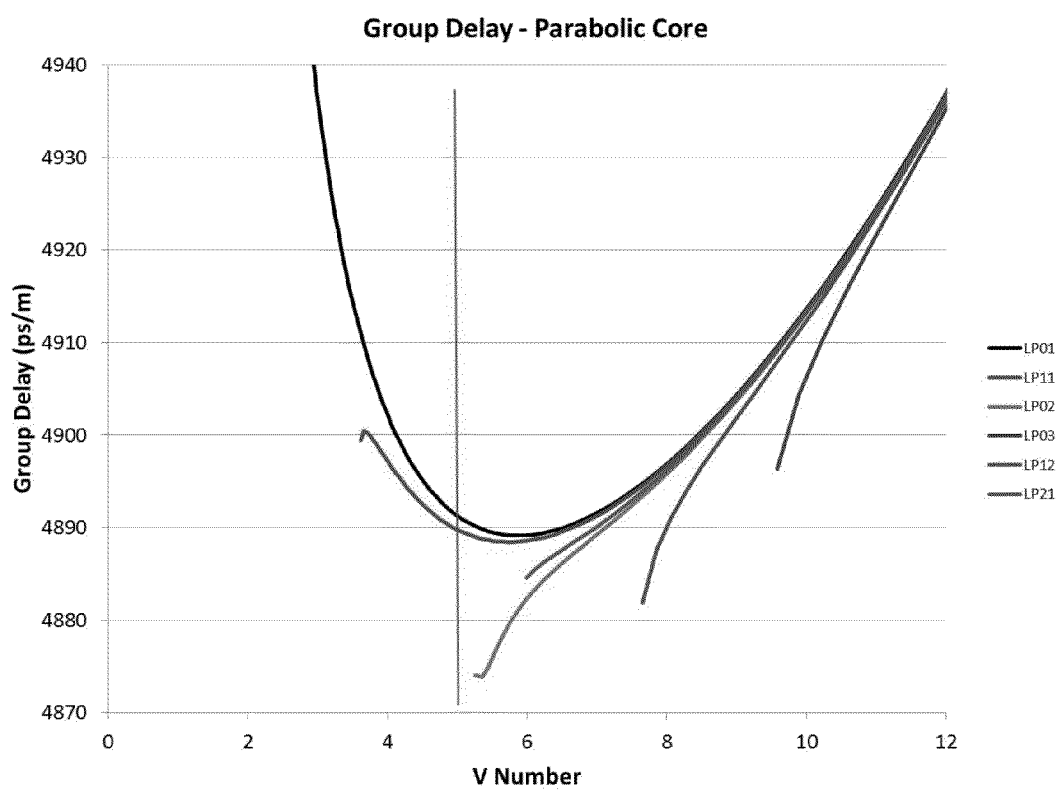
FIG. 6 shows group delay curves for 6 modes of a parabolic ($\alpha=2.00$) core fiber.

The inability of two-mode, step-index fibers to simultaneously provide low DGD, low mode coupling and low DMA leads to consideration of fibers with more complicated core shape. It was pointed out in prior work that when the core shape parameter $\alpha$ is 2.5 that the group delay curves of the $LP_{01}$ and $LP_{11}$ modes cross when V is ~5.5 and that the fiber is effectively two-moded. FIG. 4 5 and FIG. 6 show curves of the normalized propagation constant and group delay, respectively, for the first 6 LP modes of a parabolic ($\alpha$=2.00) core fibers a function V. For non step-index fibers, i.e. $\alpha \neq \infty$, we define V as previously defined for step-index fibers. When $\alpha$ is finite, the fiber is single moded when $V < 2.405 \cdot (1+2/\alpha)^2$. For example, cutoff occurs when V=3.40 for a parabolic profile. The core shape parameter a can be chosen to minimize DGD at a particular wavelength.

FIG. 5 illustrates that when V~6, the difference between the propagation constants of the $LP_{01}$ and $LP_{11}$ are large which gives low sensitivity to mode coupling between the $LP_{01}$ and $LP_{11}$ modes. Also when V~6 the normalized propagation constant of the $LP_{11}$ mode of the parabolic core fiber is quite large which minimizes the coupling of $LP_{11}$ to leaky modes. Further, the propagation constant of the $LP_{02}$ and $LP_{21}$ modes are very small so that these modes will be very lossy and therefore only the two lowest order modes propagate with low loss. FIG. 6 shows for a parabolic core shape that when V~6 the difference between the $LP_{01}$ and $LP_{11}$ group delays is low.

FIG. 4 5 and FIG. 6 also show that when the V of a parabolic core shape fiber has value slightly larger than 6, the first four LP modes will have widely spaced propagation constants giving low mode coupling as well as low DGD. Further, the propagation constants of the $LP_{02}$ and $LP_{21}$ modes are maximized while higher order modes are effectively cut-off.

When V~6, the normalized propagation constants and the difference between the propagation constants of the $LP_{01}$ and $LP_{11}$ are large which gives low sensitivity to mode coupling between the $LP_{01}$ and $LP_{11}$ modes and between the $LP_{11}$ mode and leaky modes. Further, the propagation constant of the $LP_{02}$ and $LP_{21}$ modes are very small so that these modes will be very lossy and therefore only the two lowest order modes propagate with low loss. Also, when V~6 and the difference between the $LP_{01}$ and $LP_{11}$ group delays is low.

Figure 9:
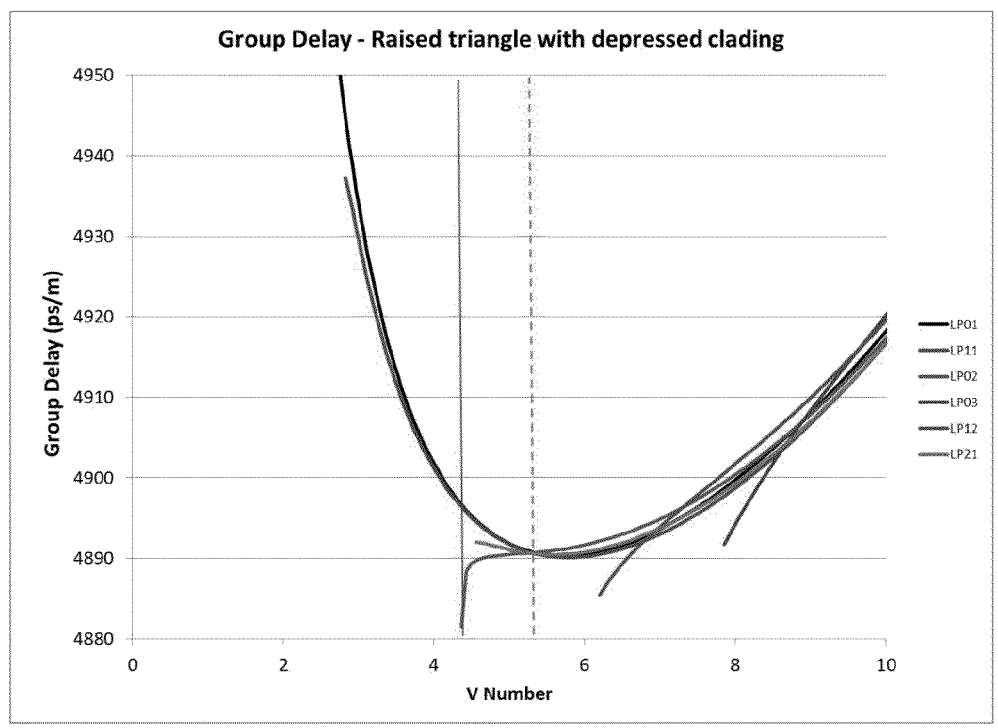
FIG. 9 shows low differential group delay between $LP_{01}$ and $LP_{11}$ modes over a wide range of V-numbers for the raised-triangle, depressed cladding profile shape.

FIG. 9 shows group delay curves for 6 modes of a parabolic ($\alpha$=2.00) core fiber. The difference between the group delay curves for the $LP_{01}$ and $LP_{11}$ modes is small for V~6.

Figure 7:
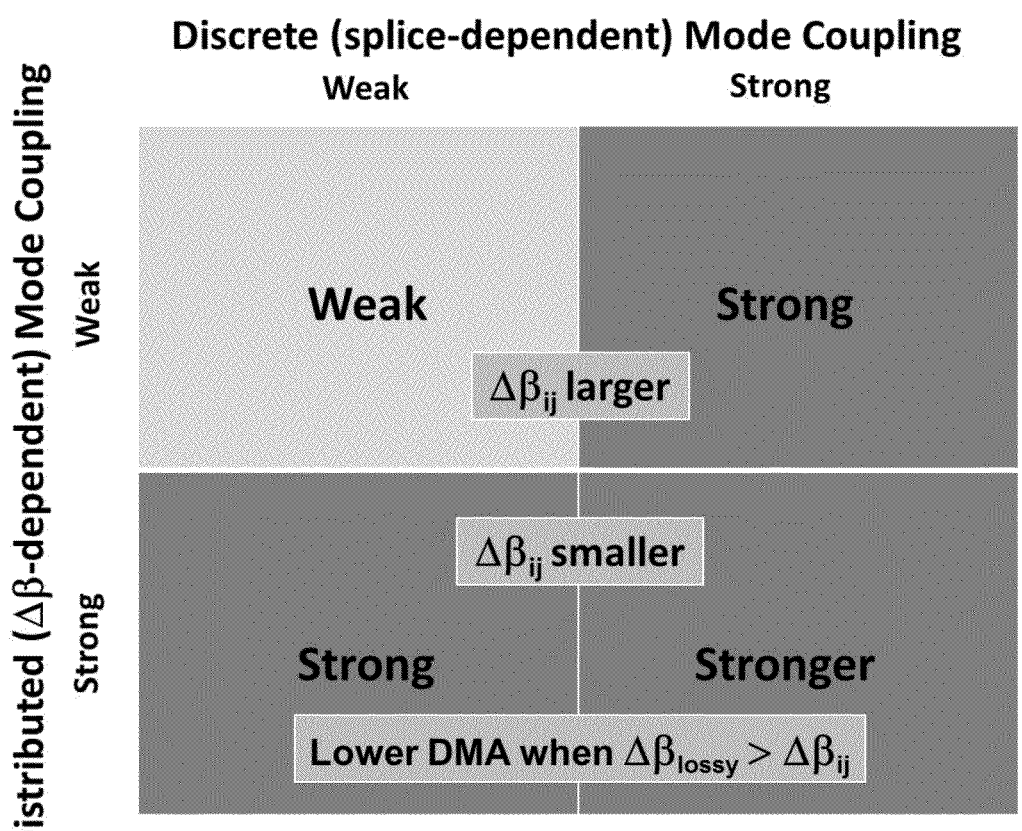
FIG. 7 The strength of mode coupling in a deployed FMF transmission line.

While two regimes of strong and weak mode coupling for few-mode transmission have been contemplated, there may be some doubt that a weak coupling regime will exist in a deployed transmission link. The picture can be clarified by considering that the strength of mode coupling in a FMF transmission line will depend on both distributed and discrete contributions. FIG. 7 shows a four-quadrant chart illustrating the possibilities. In a deployed fiber cable splices will occur approximately every five kilometers, so an 80 km amplified span will contain about 16 splices on average. Furthermore, other components such as wavelength selective switches and optical amplifiers will also be nodes for mode-coupling. If the mode coupling at splices is sufficient such that the correlation length $l_c$ is equal to five to 10 cable segments, then transmission will occur in a strongly mode-coupled regime regardless of the strength of distributed mode coupling in the fiber (i.e. regardless of $\Delta\beta_{ij}$). This will have the beneficial result that DGD will accumulate as $\sqrt{L}$ in the link, and mitigate the impact of DMA, but necessitate full 2N×2N MIMO processing in all cases. However large $\Delta\beta$ will nonetheless generally give the lowest possible DMA and perhaps always be desirable for this fundamental reason. With reference to FIG. 7, the strength of mode coupling in a deployed FMF transmission line will depend on both distributed and discrete mode coupling. Transmission in the weakly mode-coupled regime requires that both contributions be weak. If discrete mode coupling at splices, connections, and in-line components is sufficiently strong, then the mode spacings in the fiber $\Delta\beta$ will be of secondary importance for mode-mixing considerations but remain of primary importance for minimizing DMA.

The impact of splicing modern FMF on mode coupling has not yet been quantitatively determined, although early studies considered loss and mode-mixing at splices of traditional MMF. If it be the case that splices, connectors, and components generally leads to the strong mode coupling regime, then the upper right quadrant of FIG. 7 may prove to be the best approach to FMF design, yielding lowest possible DGD and DMA, though necessitating full 2N×2N MIMO processing at the receiver.

Table I shows the modal content of the LP modes in terms of the more fundamental HE, TE, and TM modes. To calculate the total number of modes onto which data can be multiplexed, multiply by two to account for the two polarizations for each spatial mode pattern.

| LP-Mode Designation | True Mode Content | Number of Degenerate Spatial Modes |
|---|---|---|
| $LP_{01}$ | $HE_{11}$ | 1 |
| $LP_{11}$ | $TE_{01}, TM_{01}, HE_{21}$ | 2 |
| $LP_{21}$ | $EH_{11}, HE_{31}$ | 2 |
| $LP_{02}$ | $HE_{12}$ | 1 |
| $LP_{31}$ | $EH_{21}, HE_{41}$ | 2 |
| $LP_{12}$ | $TE_{02}, TM_{02}, HE_{22}$ | 2 |
| $LP_{41}$ | $EH_{31}, HE_{51}$ | 2 |
| $LP_{22}$ | $EH_{12}, HE_{32}$ | 2 |

The table illustrates that designing a FMF to support, e.g. 10 low loss, orthogonal spatial modes is equivalent to designing for the lowest 6 LP modes for transmission. Increasing the number of low loss modes requires increasing the V-number. If V is increased by raising the core diameter, then the modes will become more closely spaced, the mode $A_{\textit{eff}}$ will increase, and $\Delta\beta_{lossy}$ will become smaller leading to higher DMA. If V is increased by the increasing the core $\Delta$, then the mode $A_{\textit{eff}}$ will decrease, Rayleigh scattering losses will increase due to higher concentration of $GeO_2$, and the modal spacing will increase helping to minimize DMA. A judicious combination of adjusting core $\Delta$ and diameter, along with other degrees of freedom in the profile, will be necessary to guide 10 to 20 modes with low DMA and low attenuation losses.

FIG. 4 shows for a step-index fiber that the DGD between the $LP_{01}$ and $LP_{11}$ modes can be small only when the V-number is near 3.15, i.e. where the group delay curves cross. Therefore to obtain low DGD with a step index profile requires tight tolerances on core delta and core radius to ensure that the V-number is close to 3.15. FIG. 3 also shows that the group delay will remain low only over a narrow range of wavelengths.

Figure 8:
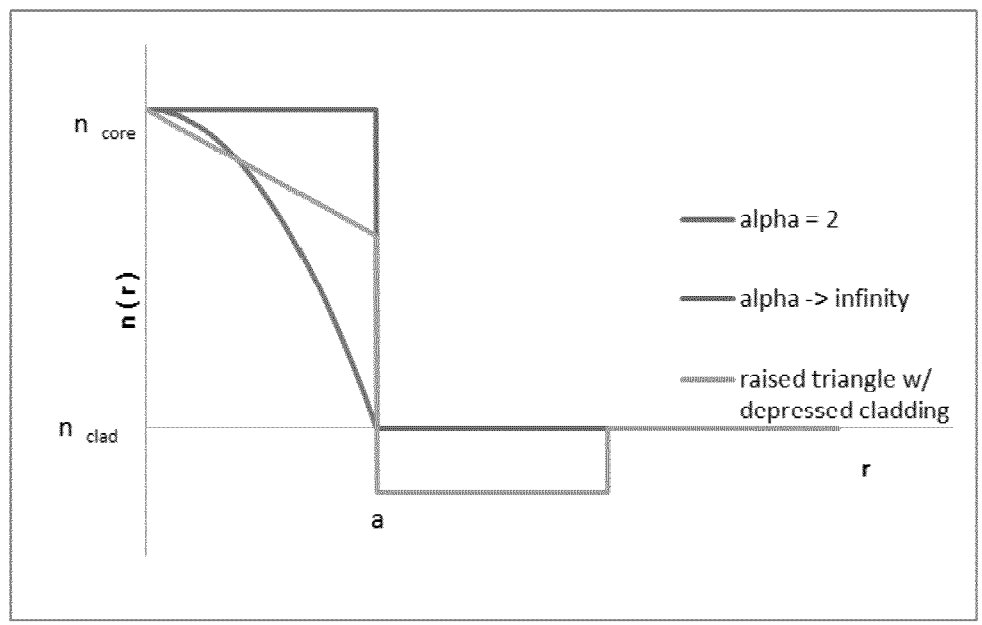
FIG. 8 illustrates a raised-triangle, depressed cladding index profile that is optimized for low DGD and ease of manufacturing.

FIG. 8 illustrates a raised-triangle, depressed cladding index profile that is optimized for low DGD and ease of manufacturing of two-mode fiber over broad wavelength range and four-mode fiber over narrow wavelength range. In FIG. 8 $n_{clad}$ is undoped silica (zero delta). The core comprises a portion extending from the center of the core, $n_{core}$, to radius a, in which the refractive index decreases linearly to point a. The maximum refractive index value of point a is greater than half of the value at $n_{core}$. Abutting or adjacent the core is a down doped trench as shown. In FIG. 8, the trench is shown in contact with the core. However, in some cases there may be a ledge between the core and the trench.

The term "ledge" is used herein the define a region separating an up-doped core and a down-doped trench. Typically the ledge portion is undoped.

In general terms the optical fiber just described can be characterized as having a core and a cladding surrounding the core, wherein the core and cladding have a refractive index profile that is structured to support propagation of a plurality of desired signal-carrying modes, while suppressing undesired modes, wherein the core comprises a portion extending from the center of the core, $n_{core}$, to radius a, in which the refractive index decreases linearly from $n_{core}$ to point a, wherein the cladding comprises a down-doped cladding region abutting or adjacent to the core, and an undoped cladding region abutting the down-doped cladding region, wherein the core, and cladding are configured to support propagation of a spatially multiplexed optical signal comprising a plurality of desired modes, while suppressing undesired modes, wherein the core and surrounding cladding is configured such that undesired modes have respective effective indices that are close to or less than the cladding index so as to result in leaky modes that leak into the outer cladding region, and wherein the index spacing between the desired mode having the lowest effective index and the leaky mode with the highest effective index is sufficiently large so as to substantially prevent coupling therebetween.

Figure 11:
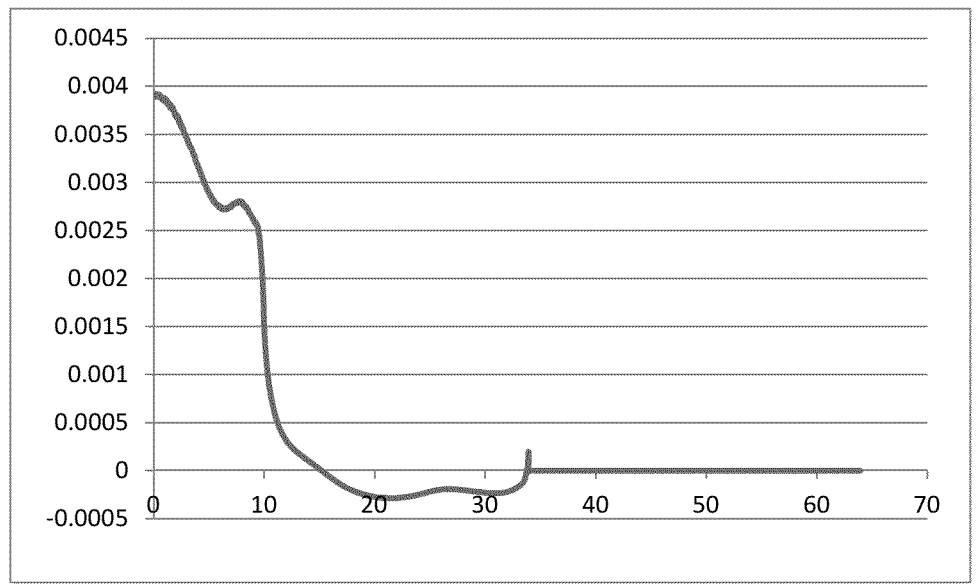
FIG. 11 illustrates a raised triangle profile based on actual VAD core shape.

FIG. 11 shows an index profile as in FIG. 8, referred to as a raised-triangle, depressed cladding design, that is optimized to provide 2-mode operation with low DGD over a wider range of V than a step index profile. The DGD of a two-mode fiber design with this profile shape is insensitive to V-number.

FIG. 9 shows the group delay curves calculated for a prototype raised-triangle, depressed-cladding fiber fabricated using the VAD process. The group delay curves for the $LP_{01}$ and $LP_{11}$ modes fall very close to one another over a broad range of V-numbers. This behavior maintains low DGD, i.e. less than 100 ps/km over the entire C-Band, while using standard fabrication techniques used for manufacturing single mode transmission fibers and manufacturing tolerances typical for SSMF. The VAD and rod-in-tube manufacturing techniques were used to fabricate a few hundred kilometers of raised-triangle, depressed-cladding, two-mode optical fiber with low DGD, low DMA and good axial uniformity. The $A_{\textit{eff}}$ of the $LP_{01}$ and LP11 modes were 155 μm² and 160 μm², respectively. The attenuation of the two mode fiber was 0.2 dB/km.

Figure 10:
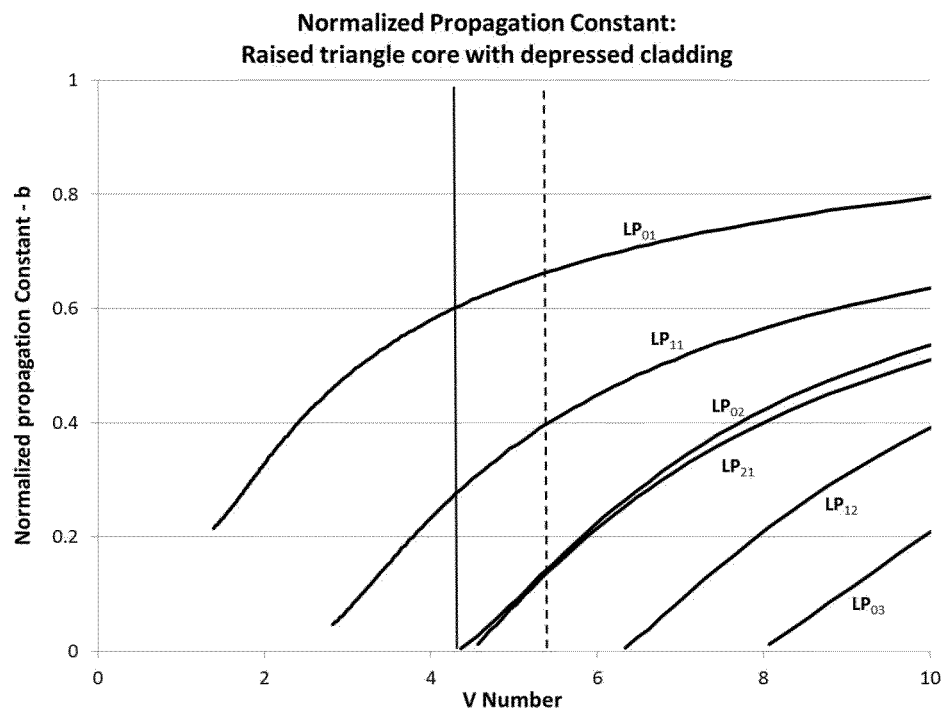
FIG. 10 shows normalized propagation constant as a function of V-number of a raised-triangle, depressed cladding design.

FIG. 10 shows normalized propagation constant as a function of V-number of a raised-triangle, depressed cladding design. When V~4.5, the waveguide supports the propagation of two modes with low DGD as indicated in FIG. 10. The previous example shows that zero DGD can be achieved for two-mode fibers with step-index, parabolic index and raised triangle core depressed cladding index shapes. FIG. 4 shows that for a step index fiber the group delay curves of all propagating modes cross only for the two-mode case when V=3.15. FIG. 10 shows that, for parabolic core fiber, V can be chosen so that the group delay curves of all but the highest order propagating mode lie very close together and therefore low DGD is achievable. V is properly chosen when the highest order mode is effectively cutoff. FIG. 10 shows that for the raised-triangle depressed cladding fiber when V~5.31 the group delay curves for the $1^{st}$ four LP modes simultaneously cross resulting in low DGD across all four low loss modes. However β for the $LP_{02}$ and $LP_{21}$ modes are small which may result in elevated sensitivity to macrobends and strong coupling to leaky modes. Since the group delay curves do not simultaneously cross for larger values of V, this design does not provide low DGD for a more than four LP modes.

Example 1

FIG. 11 shows a raised triangle profile based on actual VAD core shape. The fiber has 116 ps/km DGD at 1550 nm for the LP01, LP11, LP02, and LP21 modes.

The following chart gives calculated properties of the raised triangle, depressed clad profile shown in previous figure.

| 1550 nm Properties | LP01 | LP11 | LP02 | LP21 |
|---|---|---|---|---|
| Chromatic Dispersion (ps/nm-km) | 19.99 | 20.43 | 9.15 | 15.30 |
| Aeff (um2) | 177.1 | 180.6 | 353 | 239.5 |
| Effective Index (delta) | 0.00362 | 0.00215 | 0.00074 | 0.00071 |

Since variations on the step index design such as the raised triangle, depressed-cladding profile can provide only a narrow design space for low DGD when no more than four modes are allowed to propagate, an alternative is to consider Graded Index (GRIN) fiber designs. The index profile considered here consists of a graded-index core region and a depressed cladding region (i.e. a "trench"). There could be a number of additional design features between the graded core and the trench, such as a shelf region between the core and the trench or an index step between the core and the trench. The purpose of these features to the index profile outside the core region is to provide additional flexibilities to manipulate the spacing of the modal propagation constants so that the desired combination of transmission properties can be obtained. The simplest way to characterize the graded-core region was shown in Eq. 1. The alpha parameter α can be chosen between 1 and ∞, whereas α=2 corresponds to an inverted parabola. For two-mode design, low DGD between $LP_{01}$ and $LP_{11}$ modes can be obtained with any α between 1 and ∞ combining proper values of other profile parameters such as $n_{core}$,

| wave | gd01 | gd11 | gd02 | gd03 | gd12 | gd21 | dgdn (ps/m) | N01 | N11 | N02 | N03 | N12 | N21 |
|---|---|---|---|---|---|---|---|---|---|---|---|---|---|
| 1.3 | 4890.3 | 4890.0 | 4891.7 | | 4886.7 | 4890.7 | 5.044 | 1.45114 | 1.4499 | 1.44877 | 0 | 1.44737 | 1.44871 |
| 1.31 | 4890.3 | 4890.0 | 4891.7 | | 4886.1 | 4890.7 | 5.556 | 1.45102 | 1.44977 | 1.44863 | 0 | 1.44722 | 1.44857 |
| 1.32 | 4890.3 | 4890.0 | 4891.7 | | 4885.5 | 4890.7 | 6.15 | 1.4509 | 1.44964 | 1.44848 | 0 | 1.44708 | 1.44843 |
| 1.33 | 4890.4 | 4890.1 | 4891.7 | | 4884.7 | 4890.7 | 6.98 | 1.45078 | 1.44951 | 1.44834 | 0 | 1.44694 | 1.44828 |
| 1.34 | 4890.4 | 4890.1 | 4891.7 | | | 4890.8 | 1.594 | 1.45065 | 1.44937 | 1.44819 | 0 | 0 | 1.44814 |
| 1.35 | 4890.4 | 4890.2 | 4891.7 | | | 4890.8 | 1.554 | 1.45053 | 1.44924 | 1.44805 | 0 | 0 | 1.448 |
| 1.36 | 4890.5 | 4890.2 | 4891.8 | | | 4890.8 | 1.512 | 1.45041 | 1.44911 | 1.44791 | 0 | 0 | 1.44786 |
| 1.37 | 4890.6 | 4890.3 | 4891.8 | | | 4890.9 | 1.466 | 1.45028 | 1.44898 | 1.44776 | 0 | 0 | 1.44771 |
| 1.38 | 4890.6 | 4890.4 | 4891.8 | | | 4891.0 | 1.418 | 1.45016 | 1.44885 | 1.44762 | 0 | 0 | 1.44757 |
| 1.39 | 4890.7 | 4890.5 | 4891.8 | | | 4891.0 | 1.366 | 1.45004 | 1.44871 | 1.44747 | 0 | 0 | 1.44743 |
| 1.4 | 4890.8 | 4890.6 | 4891.9 | | | 4891.1 | 1.311 | 1.44991 | 1.44858 | 1.44733 | 0 | 0 | 1.44728 |
| 1.41 | 4890.9 | 4890.7 | 4891.9 | | | 4891.2 | 1.253 | 1.44979 | 1.44845 | 1.44718 | 0 | 0 | 1.44714 |
| 1.42 | 4891.0 | 4890.8 | 4892.0 | | | 4891.3 | 1.193 | 1.44967 | 1.44831 | 1.44704 | 0 | 0 | 1.447 |
| 1.43 | 4891.1 | 4890.9 | 4892.0 | | | 4891.4 | 1.128 | 1.44954 | 1.44818 | 1.44689 | 0 | 0 | 1.44685 |
| 1.44 | 4891.2 | 4891.0 | 4892.1 | | | 4891.5 | 1.06 | 1.44942 | 1.44805 | 1.44675 | 0 | 0 | 1.44671 |
| 1.45 | 4891.3 | 4891.2 | 4892.2 | | | 4891.6 | 0.989 | 1.44929 | 1.44791 | 1.4466 | 0 | 0 | 1.44657 |
| 1.46 | 4891.5 | 4891.3 | 4892.2 | | | 4891.7 | 0.914 | 1.44917 | 1.44778 | 1.44646 | 0 | 0 | 1.44642 |
| 1.47 | 4891.6 | 4891.5 | 4892.3 | | | 4891.8 | 0.835 | 1.44904 | 1.44764 | 1.44631 | 0 | 0 | 1.44628 |
| 1.48 | 4891.8 | 4891.6 | 4892.4 | | | 4891.9 | 0.754 | 1.44892 | 1.44751 | 1.44617 | 0 | 0 | 1.44613 |
| 1.49 | 4891.9 | 4891.8 | 4892.5 | | | 4892.0 | 0.667 | 1.44879 | 1.44737 | 1.44602 | 0 | 0 | 1.44599 |
| 1.5 | 4892.1 | 4892.0 | 4892.5 | | | 4892.2 | 0.578 | 1.44866 | 1.44724 | 1.44588 | 0 | 0 | 1.44584 |
| 1.51 | 4892.2 | 4892.1 | 4892.6 | | | 4892.3 | 0.484 | 1.44854 | 1.4471 | 1.44573 | 0 | 0 | 1.4457 |
| 1.52 | 4892.4 | 4892.3 | 4892.7 | | | 4892.4 | 0.386 | 1.44841 | 1.44697 | 1.44558 | 0 | 0 | 1.44555 |
| 1.53 | 4892.6 | 4892.5 | 4892.8 | | | 4892.6 | 0.284 | 1.44828 | 1.44683 | 1.44544 | 0 | 0 | 1.4454 |
| 1.54 | 4892.8 | 4892.7 | 4892.9 | | | 4892.7 | 0.178 | 1.44816 | 1.44669 | 1.44529 | 0 | 0 | 1.44526 |
| 1.55 | 4893.0 | 4892.9 | 4893.0 | | | 4892.9 | 0.116 | 1.44803 | 1.44656 | 1.44515 | 0 | 0 | 1.44511 |
| 1.56 | 4893.2 | 4893.1 | 4893.1 | | | 4893.0 | 0.164 | 1.4479 | 1.44642 | 1.445 | 0 | 0 | 1.44497 |
| 1.57 | 4893.4 | 4893.3 | 4893.2 | | | 4893.2 | 0.244 | 1.44777 | 1.44628 | 1.44485 | 0 | 0 | 1.44482 |
| 1.58 | 4893.6 | 4893.5 | 4893.2 | | | 4893.3 | 0.365 | 1.44764 | 1.44614 | 1.4447 | 0 | 0 | 1.44467 |
| 1.59 | 4893.8 | 4893.8 | 4893.3 | | | 4893.5 | 0.492 | 1.44751 | 1.446 | 1.44456 | 0 | 0 | 1.44452 |
| 1.6 | 4894.1 | 4894.0 | 4893.4 | | | 4893.7 | 0.624 | 1.44738 | 1.44586 | 1.44441 | 0 | 0 | 1.44437 |
| 1.61 | 4894.3 | 4894.2 | 4893.5 | | | 4893.8 | 0.762 | 1.44725 | 1.44572 | 1.44426 | 0 | 0 | 1.44423 |
| 1.62 | 4894.5 | 4894.5 | 4893.6 | | | 4894.0 | 0.905 | 1.44712 | 1.44558 | 1.44411 | 0 | 0 | 1.44408 |
| 1.63 | 4894.8 | 4894.7 | 4893.7 | | | 4894.2 | 1.054 | 1.44699 | 1.44544 | 1.44397 | 0 | 0 | 1.44393 |
| 1.64 | 4895.0 | 4895.0 | 4893.8 | | | 4894.4 | 1.21 | 1.44686 | 1.4453 | 1.44382 | 0 | 0 | 1.44378 |
| 1.65 | 4895.3 | 4895.2 | 4893.9 | | | 4894.6 | 1.372 | 1.44672 | 1.44516 | 1.44367 | 0 | 0 | 1.44363 |
| 1.66 | 4895.6 | 4895.5 | 4894.0 | | | 4894.7 | 1.541 | 1.44659 | 1.44502 | 1.44352 | 0 | 0 | 1.44348 |
| 1.67 | 4895.8 | 4895.8 | 4894.1 | | | 4894.9 | 1.716 | 1.44646 | 1.44488 | 1.44337 | 0 | 0 | 1.44333 |
| 1.68 | 4896.1 | 4896.0 | 4894.2 | | | 4895.1 | 1.899 | 1.44632 | 1.44473 | 1.44322 | 0 | 0 | 1.44318 |
| 1.69 | 4896.4 | 4896.3 | 4894.3 | | | 4895.3 | 2.089 | 1.44619 | 1.44459 | 1.44307 | 0 | 0 | 1.44303 |
| 1.7 | 4896.7 | 4896.6 | 4894.4 | | | 4895.5 | 2.288 | 1.44606 | 1.44444 | 1.44292 | 0 | 0 | 1.44287 |

$r_{core}$, trench depth and position. However, for FMF design beyond two LP modes, α is preferentially chosen close to an inverted parabola shape to achieve low DGD among all LP modes. The preferred range is 2.0+/−0.03. The trench feature has three functions. As shown in FIG. 6, $\Delta\beta_{ij}$ should be as large as possible. A trench structure allows to $\beta_{min}$ ($LP_{11}$ mode in two mode) to be closer to the cladding index while maintaining low loss and push down $\beta_{lossy}$ below the cladding index to become a leaky mode. The trench also promotes reduced bending loss and differential modal attenuation (DMA) of both $LP_{01}$ and $LP_{11}$ modes. The trench on the periphery of the raised index core also forms an index structure to manipulate DGD, especially of the high order mode(s).

The inventive fiber profiles have a maximum Δ of 0.8%, which will give lower attenuation loss, important for system performance.

Example 2

Figure 12:
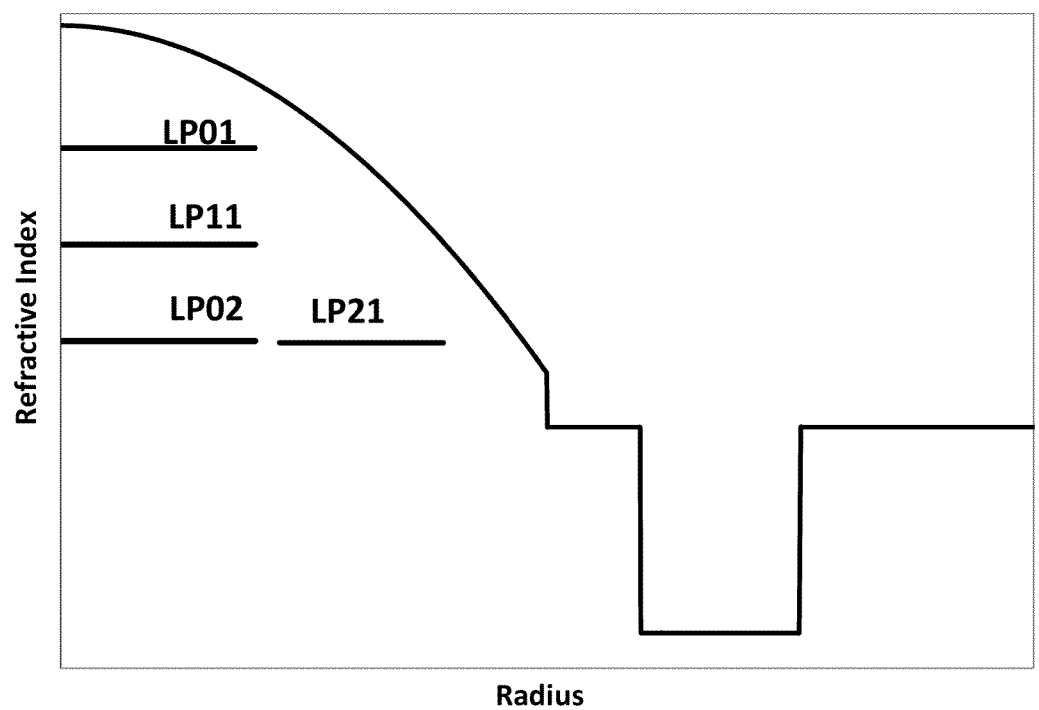
FIG. 12 shows a refractive index profile for a preferred embodiment of the invention, Example 2.

FIG. 12 shows a refractive index profile for Example 2. The fiber has a GRIN core a shelf and a trench. This profile describes a generic class of optical fibers that are particularly effective for multiple mode multiplexing. Profile parameters for the fiber design, describing the core, shelf, trench, are:

| Start delta | End Delta | Alpha | Width |
|---|---|---|---|
| 0.0080 | 0.00113 | 1.9720 | 10.0000 |
| 0.0000 | 0.0000 | 0.0000 | 1.9200 |
| −0.0041 | −0.0041 | 0.0000 | 3.2800 |
| 0.0000 | 0.0000 | 0.0000 | 50.3000 |

| 1550 nm Properties | LP01 | LP11 | LP01 | LP21 |
|---|---|---|---|---|
| Chromatic Dispersion (ps/nm-km) | 18.9 | 19.3 | 19.1 | 19.4 |
| Aeff (um2) | 93.2 | 93.5 | 186.9 | 124.6 |
| Effective Index | 0.0081 | 0.0053 | 0.0025 | 0.0025 |

Figure 13:
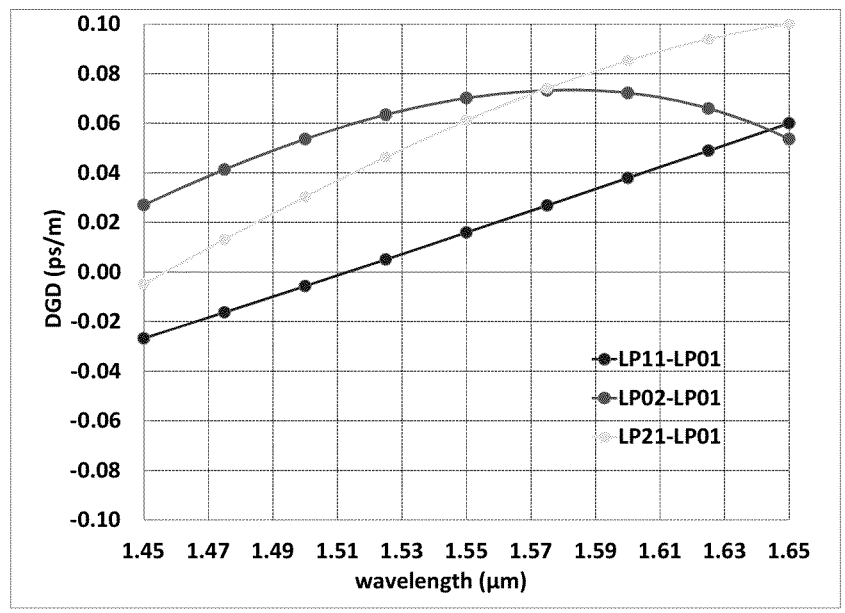
FIG. 13 shows the differential group delay for the optical fiber of Example 2.

FIG. 13 shows the differential group delays for the optical fiber of EXAMPLE 2.

As mentioned, the refractive index profile of FIG. 2 is representative of a family of optical fiber designs that were developed specifically to support multiple modes for mode division multiplexing. Many of these designs feature an alpha core, typically having an alpha value between 1.5 and 2.5, preferably 1.8 to 2.2, with a truncated edge. A truncated edge is defined as a portion in the refractive index curve that drops from a positive delta index value to zero within two microns or less. A trench may be similarly defined as having a portion of a refractive index curve that abuts or is adjacent to the core, and drops from a delta value at or near zero to a substantial negative value within 2 microns or less. So in general the preferred designs in this category have a truncated alpha core, a ledge, a trench, and an undoped cladding.

It has been found that in some optical fiber designs it may not be necessary to truncate the core. Also it has been found that some designs that omit the trench may also be effective.

Figure 14:
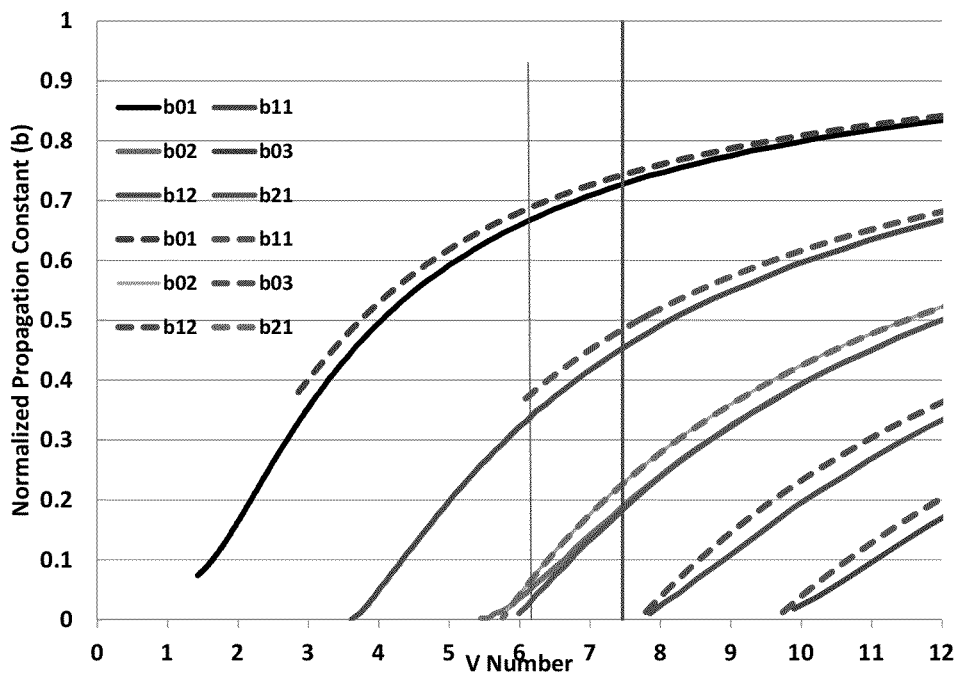
FIG. 14 shows normalized propagation constant versus V-number for two families of fiber profiles.

Design parameters for radius width that have been found to be effective are:

Truncated (or standard) core radius: 5 to 20 microns
Ledge: 1 to 5 microns
Trench: 1 to 10 microns FIG. 14 gives normalized propagation constant versus V-number for two families of fiber profiles. Solid curves are the simple parabolic (a=2) GRIN profile, while the dashed curves are for a GRIN FMF (dashed lines). The solid curves in FIG. 14 correspond to the α=2.00 GRIN fiber of FIG. 4. The dashed curves correspond to a GRIN design with an alpha profile core and a trench structure which have been optimized for transmission in the C-band. The modal structure of this new design remains similar to that of FIG. 4, with some improvement in the normalized propagation constant. For the same core index, the modes have improved macrobending characteristics, leading to improved DMA. Four LP modes, specifically $LP_{01}$, $LP_{11}$, $LP_{02}$, and $LP_{21}$, are well guided at V≈7.5, and the cutoff wavelength of the next higher-order mode $LP_{12}$ is below 1550 nm. The V-number is chosen to achieve the large effective index difference between the lowest two guided LP modes and the cladding. The large spacing of the normalized propagation constant between different guided LP modes supports a large $\Delta\beta_{lossy}$, keeping DMA low. FIG. 13 confirms the low DGD over a wide bandwidth.

Figure 15:
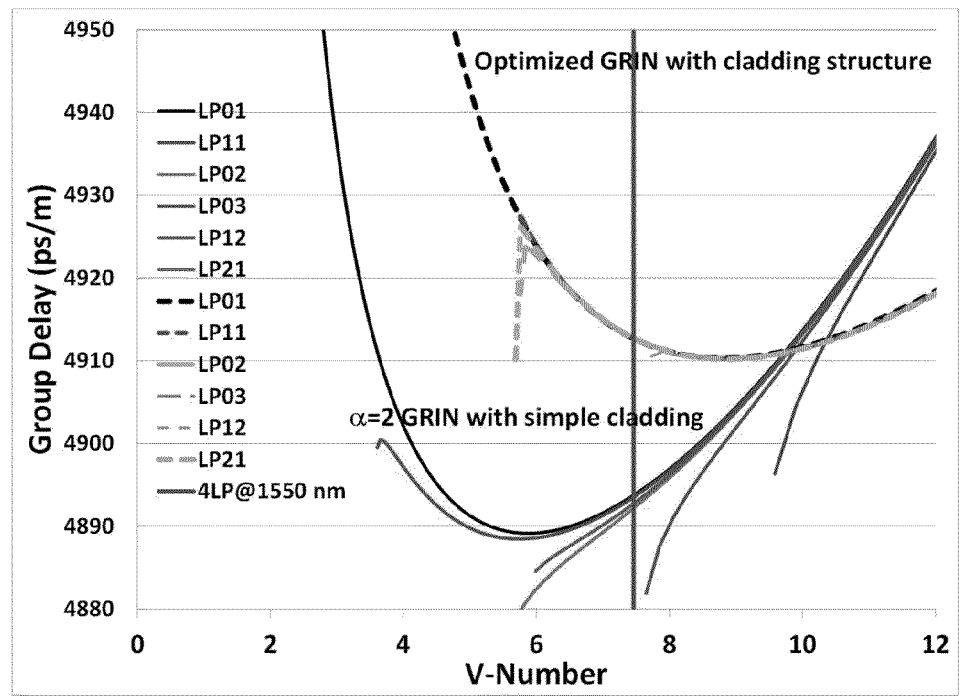
FIG. 15 shows group delays of $LP_{01}$, $LP_{11}$, $LP_{02}$, $LP_{21}$, $LP_{03}$ and $LP_{12}$ modes for a parabolic GRIN-FMF (lower curves) and a GRIN-FMF with a cladding structure, optimized for operation in the C-band (upper curves)

FIG. 15 shows group delays of $LP_{01}$, $LP_{11}$, $LP_{02}$, $LP_{21}$, $LP_{03}$ and $LP_{12}$ modes for a parabolic GRIN-FMF (lower curves) and a GRIN-FMF with a cladding structure, optimized for operation in the C-band (upper curves). The vertical line near V-number equal 7.5 corresponds to four mode operation.

Example 3

Figure 16:
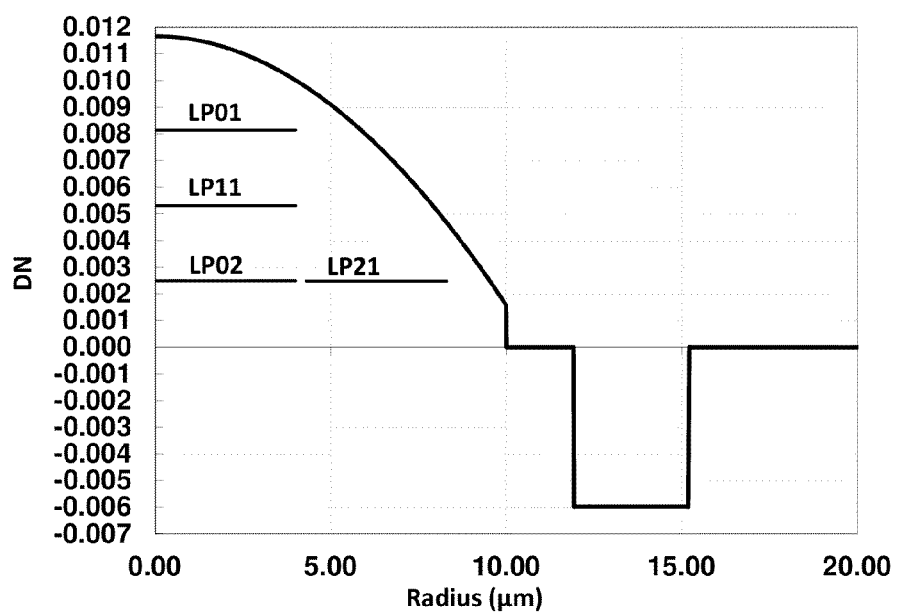
FIG. 16 is a refractive index profile for another embodiment, EXAMPLE 3, of the invention.

A further embodiment of the invention is represented by the refractive index profile of FIG. 16. Relevant design parameters are given in the following tables.

| Start Delta | End Delta | Alpha | Width (μm) |
|---|---|---|---|
| 0.008 | 0.00107 | 1.972 | 10 |
| 0 | 0 | 0 | 1.92 |
| −0.0041 | −0.0041 | 0 | 3.28 |
| 0 | 0 | 0 | 47.3 |

| 1550 nm properties | LP01 | LP11 | LP02 | LP21 |
|---|---|---|---|---|
| chromatic dispersion (ps/nm-km) | 18.5 | 18.9 | 18.6 | 19.0 |
| effective area (μm^2) | 92.5 | 92.8 | 186.2 | 123.9 |
| effective index difference | 0.0081 | 0.0053 | 0.0025 | 0.0025 |

Figure 17:
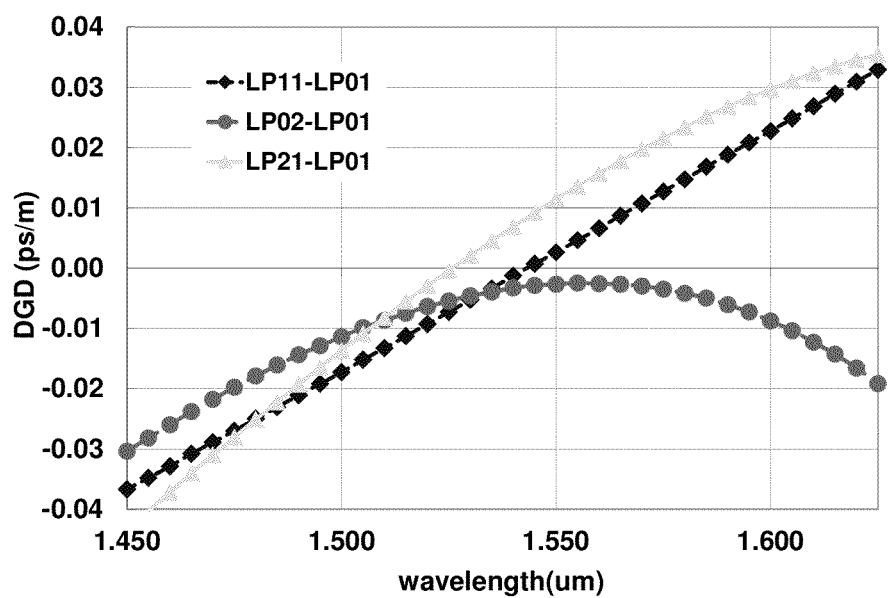
FIG. 17 gives differential group delay data for the EXAMPLE 3 embodiment.

FIG. 17 gives differential group delay data for the EXAMPLE 3 embodiment.

Example 4

Figure 18:
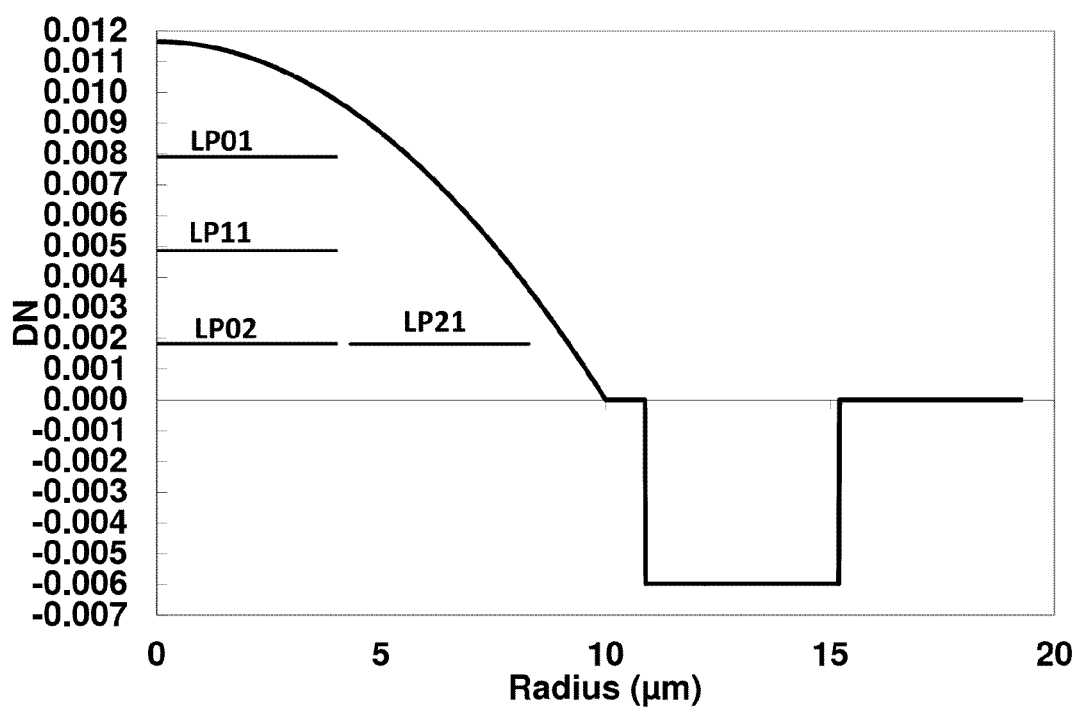
FIG. 18 is a refractive index profile for another embodiment, EXAMPLE 4, of the invention.

A further embodiment of the invention is represented by the refractive index profile of FIG. 18. Relevant design parameters are given in the following table.

| 1550 nm properties | LP01 | LP11 | LP02 | LP21 |
|---|---|---|---|---|
| chromatic dispersion (ps/nm-km) | 18.9 | 19.3 | 19.2 | 19.5 |
| effective area (μm^2) | 86.4 | 86.8 | 174.3 | 115.9 |
| effective index difference | 0.0079 | 0.0049 | 0.0018 | 0.0018 |

Figure 19:
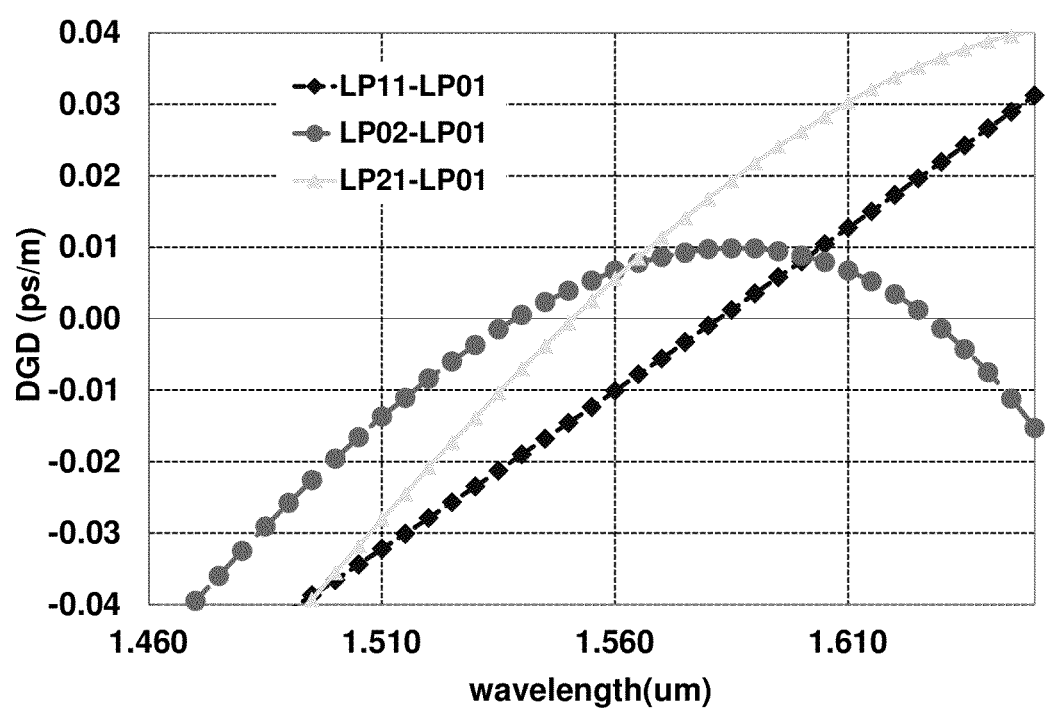
FIG. 19 gives differential group delay data for the EXAMPLE 4 embodiment.

FIG. 19 gives differential group delay data for the EXAMPLE 4 embodiment;

Example 5

Figure 20:
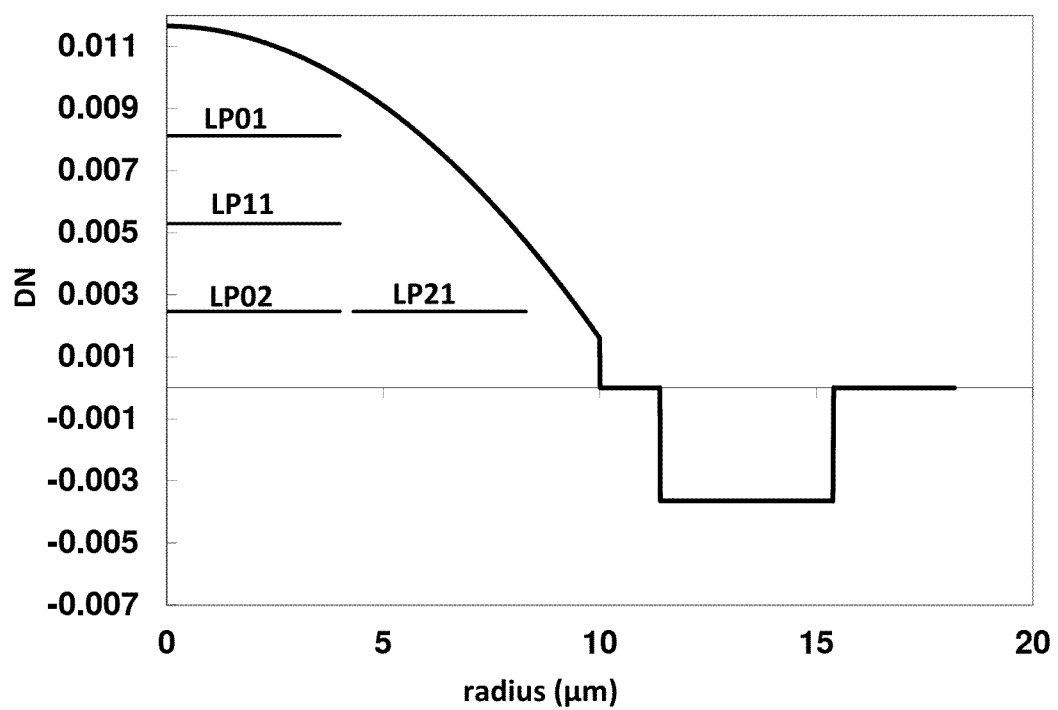
FIG. 20 is a refractive index profile for another embodiment, EXAMPLE 5, of the invention.

A further embodiment of the invention is represented by the refractive index profile of FIG. 20. Relevant design parameters are given in the following table.

| Start Delta | End Delta | Alpha | Width |
|---|---|---|---|
| 0.008 | 0.00109 | 1.972 | 10 |
| 0 | 0 | 0 | 1.39 |
| −0.0025 | −0.0025 | 0 | 4 |
| 0 | 0 | 0 | 47.11 |

| 1550 nm properties | LP01 | LP11 | LP02 | LP21 |
|---|---|---|---|---|
| chromatic dispersion (ps/nm-km) | 18.9 | 19.3 | 18.1 | 18.9 |
| effective area ($\mu m^2$) | 92.9 | 93.2 | 186.7 | 124.3 |
| effective index difference | 0.0081 | 0.0053 | 0.0025 | 0.0025 |

Figure 21:
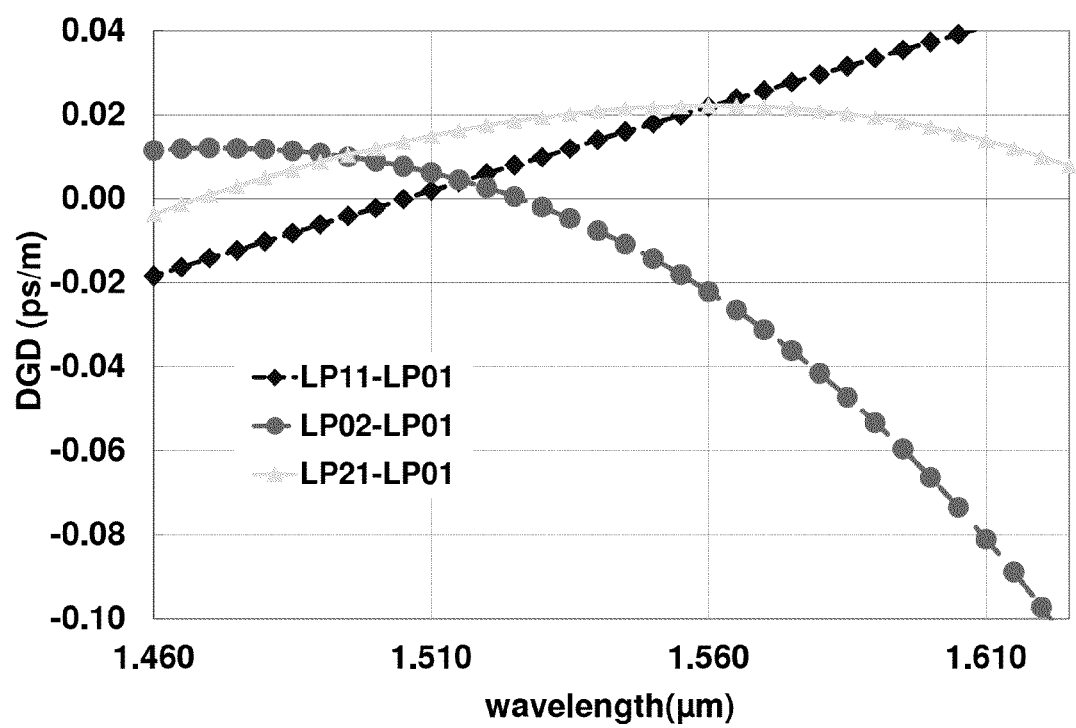
FIG. 21 gives differential group delay data for the EXAMPLE 5 embodiment.

FIG. 21 gives differential group delay data for the EXAMPLE 5 embodiment.

Example 6

Figure 22:
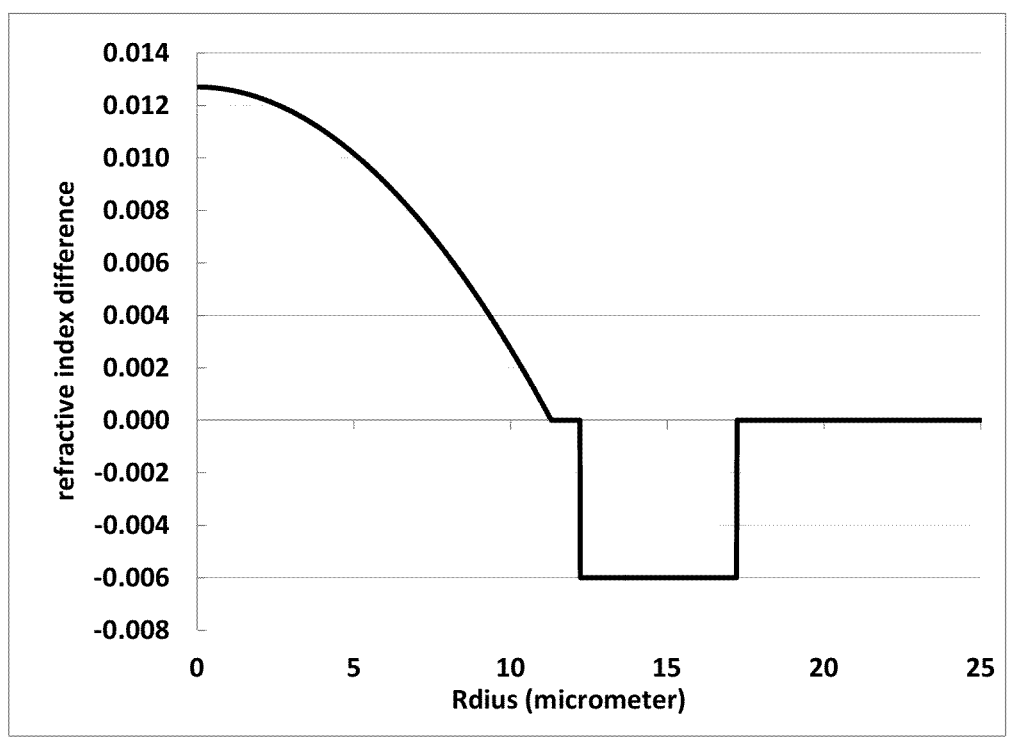
FIG. 22 is a refractive index profile for another embodiment, EXAMPLE 6, of the invention, which is a six mode design.

A further embodiment of the invention is represented by the refractive index profile of FIG. 22. This design is a six mode design. Relevant design parameters are given in the following table.

| index region | start index | end index | alpha | width |
|---|---|---|---|---|
| 1 | 0.0127 | 0.0000 | 1.97 | 11.30 |
| 2 | 0.0000 | 0.0000 | 0.00 | 0.92 |
| 3 | −0.0060 | −0.0060 | 0.00 | 5.00 |
| 4 | 0.0000 | 0.0000 | 0.00 | 45.28 |

Figure 23:
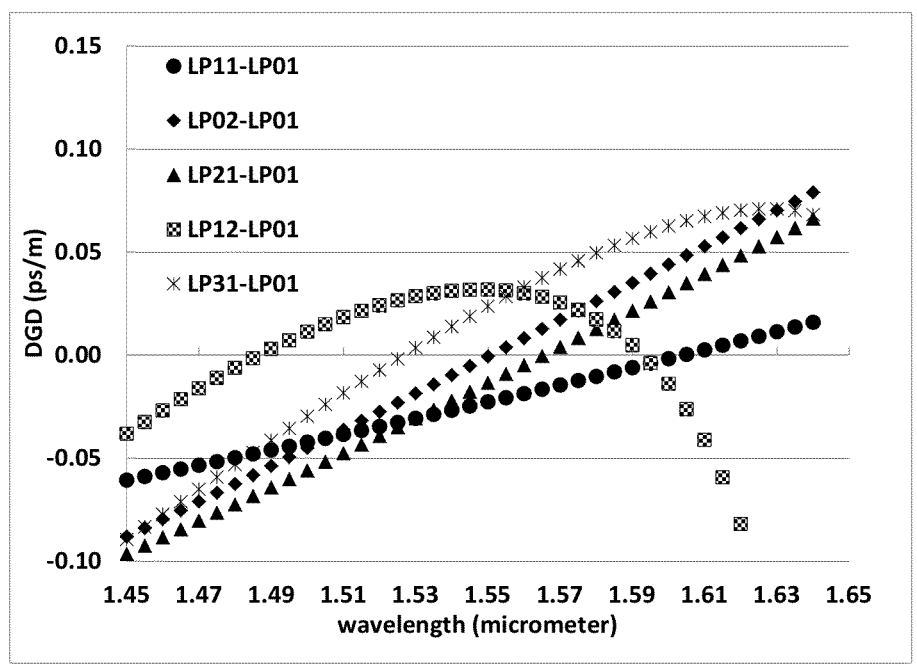
FIG. 23 gives differential group delay between first five higher order LP modes and LP01 mode for the EXAMPLE 6 design.

FIG. 23 gives differential group delay between first five higher order LP modes and LP01 mode for the design in table above.

The following table shows effective area of $LP_{01}$, $LP_{11}$, $LP_{02}$, $LP_{21}$, $LP_{12}$ and $LP_{31}$ modes versus wavelength of the six-mode design in FIG. 22.

| wavelength (um) | effective area (um^2) | | | | | |
|---|---|---|---|---|---|---|
| | LP01 | LP11 | LP02 | LP21 | LP12 | LP31 |
| 1.500 | 90 | 91 | 182 | 121 | 291 | 146 |
| 1.505 | 91 | 91 | 183 | 122 | 292 | 146 |
| 1.510 | 91 | 91 | 184 | 122 | 293 | 147 |
| 1.515 | 91 | 92 | 184 | 123 | 294 | 147 |
| 1.520 | 92 | 92 | 185 | 123 | 295 | 148 |
| 1.525 | 92 | 92 | 185 | 123 | 296 | 148 |
| 1.530 | 92 | 93 | 186 | 124 | 297 | 149 |
| 1.535 | 92 | 93 | 187 | 124 | 298 | 149 |
| 1.540 | 93 | 93 | 187 | 125 | 299 | 150 |
| 1.545 | 93 | 94 | 188 | 125 | 300 | 150 |
| 1.550 | 93 | 94 | 189 | 125 | 301 | 151 |
| 1.555 | 94 | 94 | 189 | 126 | 302 | 151 |
| 1.560 | 94 | 94 | 190 | 126 | 304 | 152 |
| 1.565 | 94 | 95 | 190 | 127 | 305 | 152 |
| 1.570 | 95 | 95 | 191 | 127 | 306 | 153 |
| 1.575 | 95 | 95 | 192 | 128 | 307 | 153 |
| 1.580 | 95 | 96 | 192 | 128 | 308 | 154 |
| 1.585 | 96 | 96 | 193 | 128 | 309 | 154 |
| 1.590 | 96 | 96 | 193 | 129 | 310 | 155 |
| 1.595 | 96 | 97 | 194 | 129 | 311 | 155 |
| 1.600 | 96 | 97 | 195 | 130 | 312 | 156 |
| 1.605 | 97 | 97 | 195 | 130 | 314 | 156 |
| 1.610 | 97 | 98 | 196 | 130 | 315 | 157 |
| 1.615 | 97 | 98 | 197 | 131 | 316 | 157 |
| 1.620 | 98 | 98 | 197 | 131 | 317 | 158 |
| 1.625 | 98 | 98 | 198 | 132 | 319 | 158 |

Large effective area in optical fibers can reduce nonlinear effects, both intra-modal and inter-modal. In addition, some differential group delay can reduce inter-modal nonlinear effect. However pairs of inverse differential group delay and differential group delay slope with similar effective areas would be desirable to reduce the total span group delay for simplicity and low cost receiver MIMO design.

In an effort to design very large effective area fibers that support multiple independent modes for mode division multiplexing we investigated a few mode fiber design space resulting in an effective area large than 160 $\mu m^2$ for $LP_{01}$ mode, having differential group delay near zero, tunable for inverse differential group delay and differential group delay slope pairs. We refer to these as ultra large effective area few mode fiber designs (ULA-FMF)

Example 7

ULA-FMF Design 1

Figure 24:
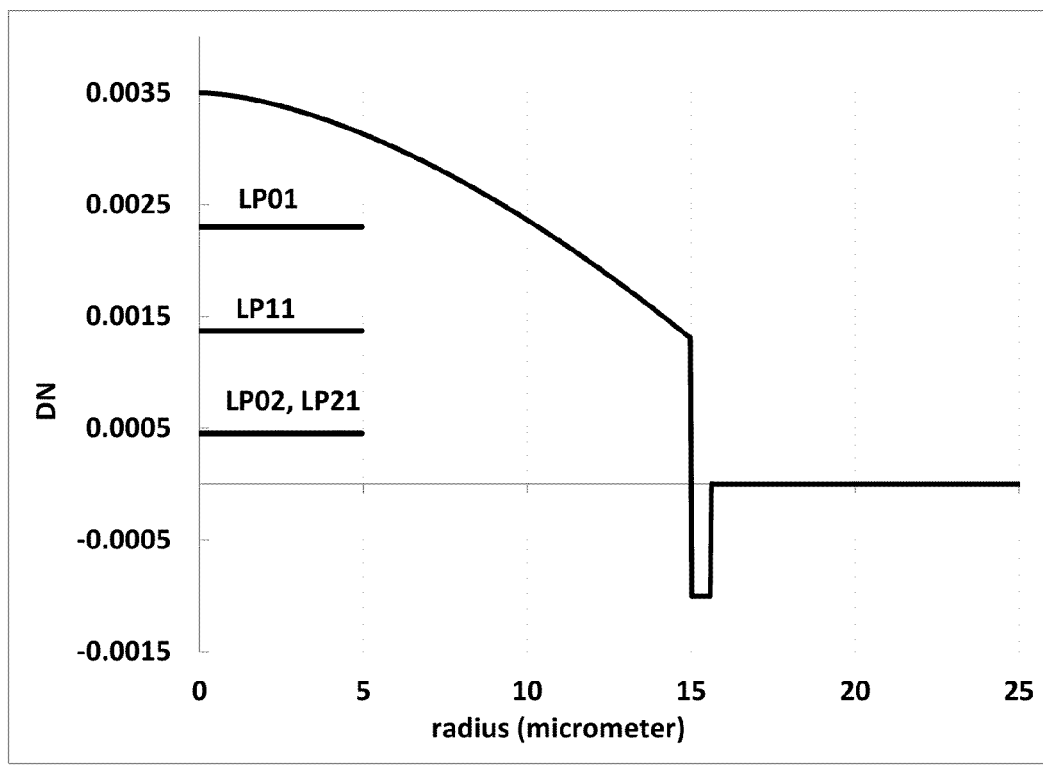
FIG. 24 shows a refractive index profile for the design of EXAMPLE 7, an Ultra Large Area Few Mode Fiber (ULA-FMF) design.

A refractive index profile for ULA-FMF EXAMPLE 7 is shown in FIG. 24. Numbers for the refractive index profile are:

| Region | Start Index | End Index | Alpha | Width |
|---|---|---|---|---|
| 1 | 0.0035 | 0.0013 | 1.63 | 15.0 |
| 2 | −0.0010 | −0.0010 | 0.00 | 0.6 |
| 3 | 0.0000 | 0.0000 | 0.00 | 46.9 |

In this ULA-FMF design the delta is kept small for low attenuation.

Figure 25:
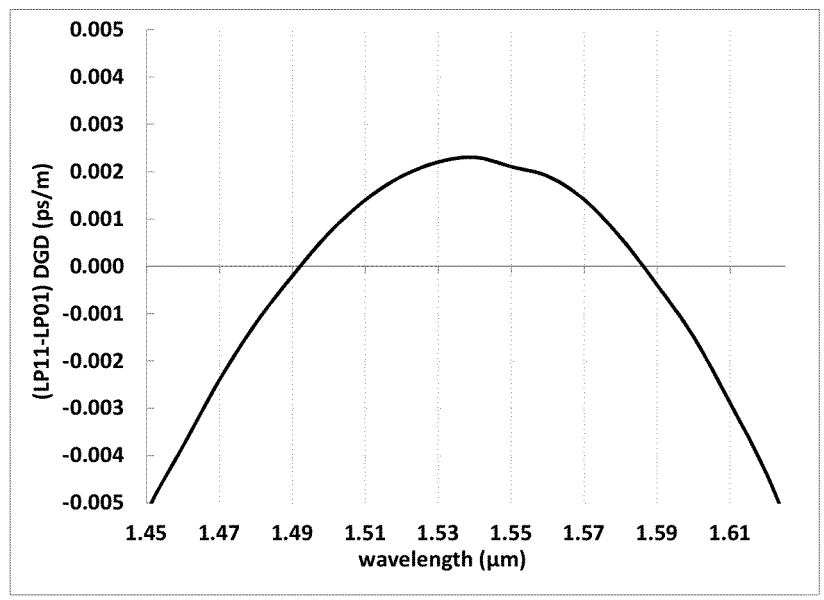
FIG. 25 shows differential group delay between $LP_{11}$ mode and LP01 mode for EXAMPLE 7.

Differential group delay between $LP_{11}$ mode and LP01 mode for this EXAMPLE is given in FIG. 25.

To illustrate the large effective area of this design the effective area is shown for a range of wavelengths in the following table:

| wavelength ($\mu m$) | $LP_{01}$ Aeff ($\mu m^2$) | $LP_{11}$ Aeff ($\mu m^2$) |
|---|---|---|
| 1.50 | 275 | 276 |
| 1.51 | 277 | 278 |
| 1.52 | 279 | 279 |
| 1.53 | 281 | 281 |
| 1.54 | 283 | 283 |
| 1.55 | 284 | 285 |
| 1.56 | 286 | 287 |
| 1.57 | 288 | 289 |
| 1.58 | 290 | 291 |
| 1.59 | 292 | 293 |
| 1.60 | 294 | 294 |
| 1.61 | 296 | 296 |

-continued

| wavelength (μm) | $LP_{01}$ Aeff (μm²) | $LP_{11}$ Aeff (μm²) |
|---|---|---|
| 1.62 | 298 | 298 |
| 1.63 | 299 | 300 |

In EXAMPLE 7 the width of the trench is less than 1 micron. In general, designs with trench widths less than 2 microns for mode division multiplexing are effective and unusual.

Example 8

ULA-FMF Design 2

Figure 26:
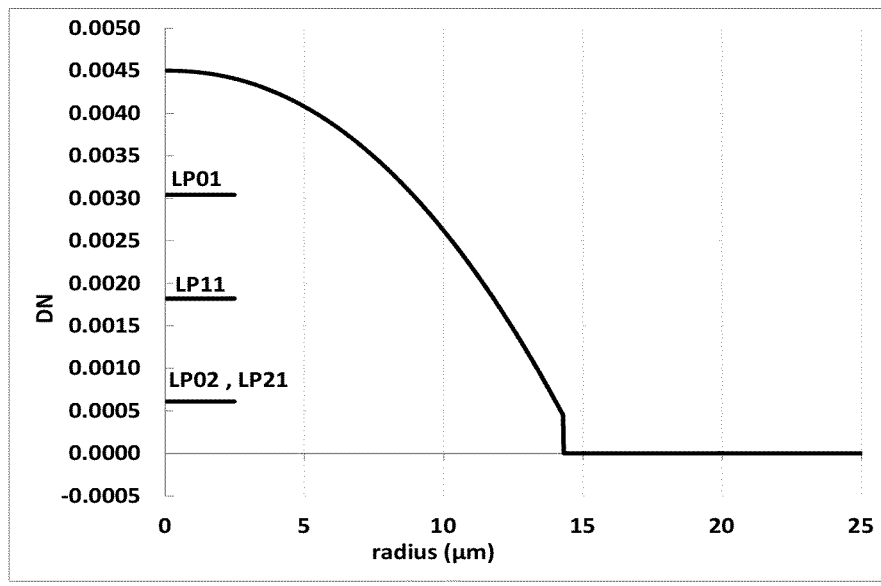
FIG. 26 shows a refractive index profile for the design of EXAMPLE 8, a second Ultra Large Area Few Mode Fiber (ULA-FMF) design.

FIG. 26 shows a refractive index profile for a second example of a ULA-FMF fiber design.
The design parameters for this example are:

| Region | Start Index | End Index | Alpha | Width |
|---|---|---|---|---|
| 1 | 0.0045 | 0.0000 | 2.150 | 15.0 |
| 2 | 0.0000 | 0.0000 | 0.000 | 47.5 |

Figure 27:
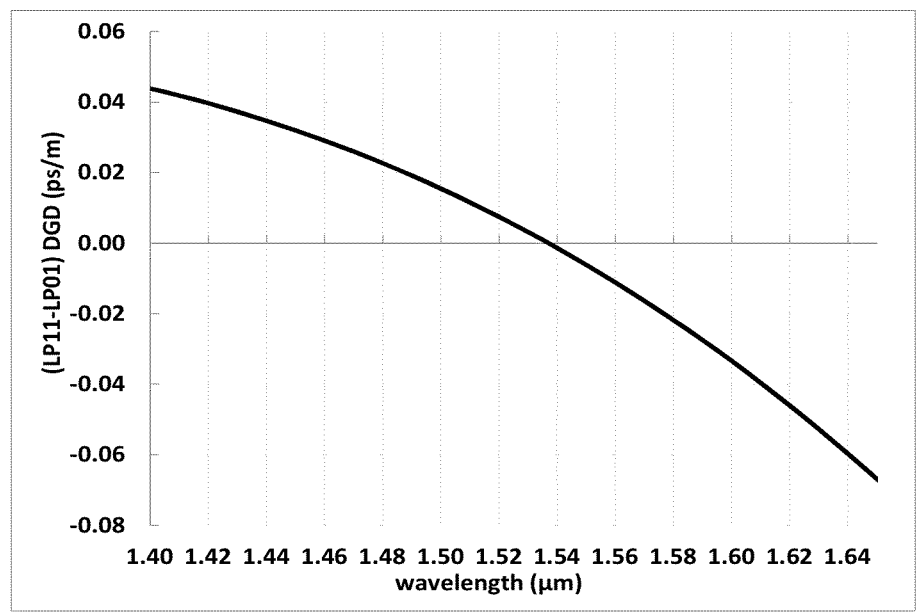
FIG. 27 shows differential group delay between $LP_{11}$ mode and LP01 mode for EXAMPLE 8.

FIG. 27 shows differential group delay between $LP_{11}$ mode and LP01 mode for the design of EXAMPLE 8.
The effective area of this design is shown for a range of wavelengths in the following table:

| wavelength (μm) | $LP_{01}$ Aeff (μm²) | $LP_{11}$ Aeff (μm²) |
|---|---|---|
| 1.50 | 209 | 207 |
| 1.51 | 210 | 208 |
| 1.52 | 211 | 210 |
| 1.53 | 213 | 211 |
| 1.54 | 214 | 213 |
| 1.55 | 216 | 215 |
| 1.56 | 217 | 216 |
| 1.57 | 218 | 218 |
| 1.58 | 220 | 219 |
| 1.59 | 221 | 221 |
| 1.60 | 222 | 222 |
| 1.61 | 224 | 224 |
| 1.62 | 225 | 226 |

Example 9

ULA-FMF Design 3

Figure 28:
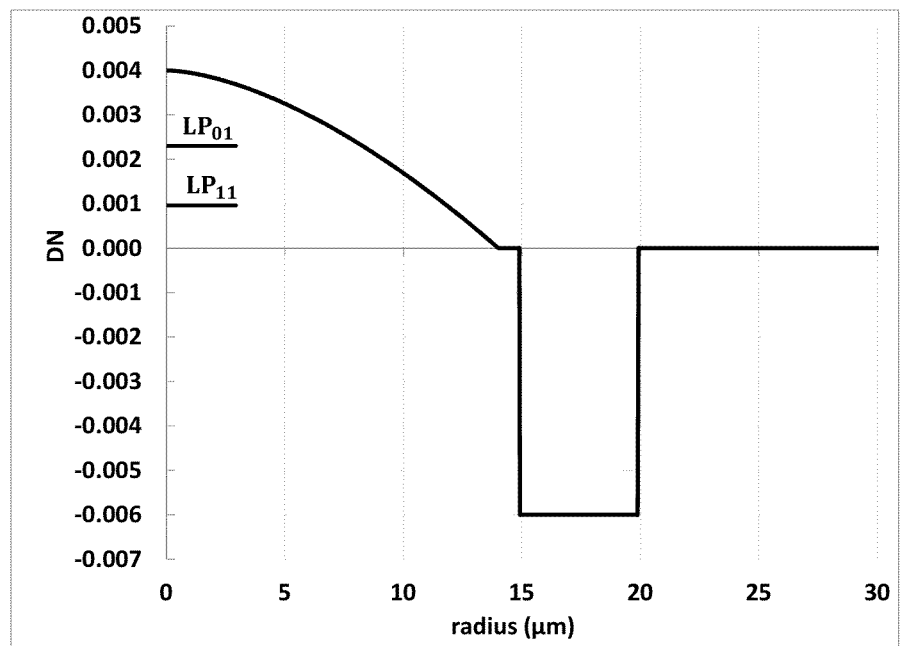
FIG. 28 shows a refractive index profile for the design of EXAMPLE 9, a third Ultra Large Area Few Mode Fiber (ULA-FMF) design.

FIG. 28 shows a refractive index profile for a third example of a ULA-FMF fiber design.
The design parameters for this example are:

| Region | Start Index | End Index | Alpha | Width |
|---|---|---|---|---|
| 1 | 0.0040 | 0.0000 | 1.625 | 14.0 |
| 2 | 0.0000 | 0.0000 | 0 | 0.9 |
| 3 | −0.0060 | −0.0060 | 0 | 5.0 |
| 4 | 0.0000 | 0.0000 | 0 | 46.9 |

Figure 29:
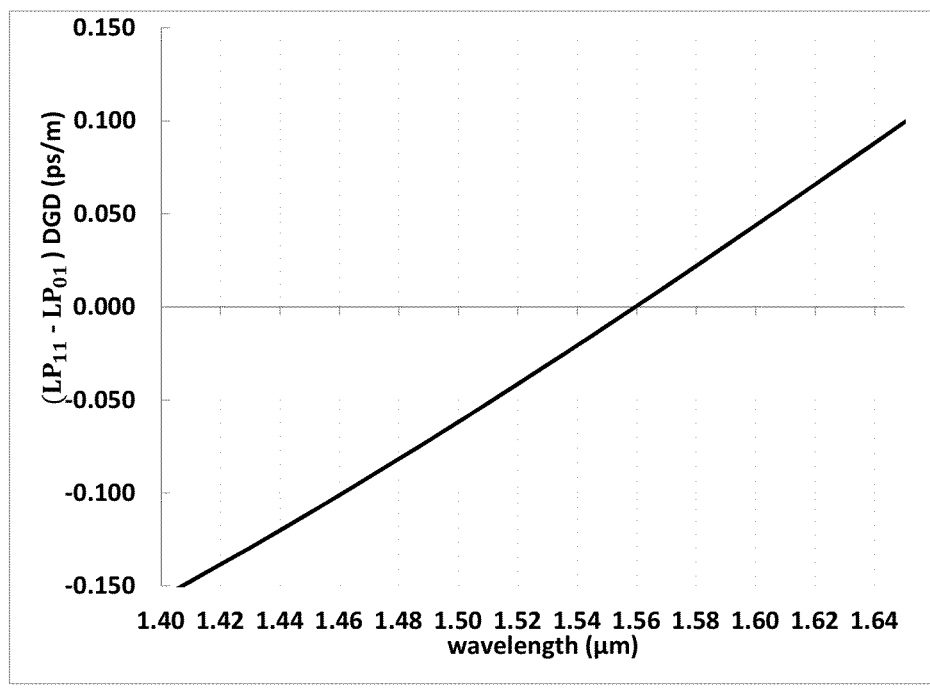
FIG. 29 shows differential group delay between $LP_{11}$ mode and LP01 mode for EXAMPLE 9.

FIG. 29 shows differential group delay between $LP_{11}$ mode and LP01 mode for the design of EXAMPLE 9.
The ULA-FMF design of EXAMPLE 9 has two guided modes ($LP_{01}$ and $LP_{11}$). $LP_{02}$ mode is cut off at 1.421 μm. The effective area $LP_{01}$ mode is 196.35 μm² at 1550 nm, close to that of ULA-FMF design 2 (215.5 μm² at 1550 nm). The DGD slope has opposite signs. Thus ULA-FMF design 2 and 3 could be used in pair to reduce total DGD across a total transmission span. The DGD values can be further increased and DGD value/DGD slope can be further optimized to minimize inter-modal nonlinear effect and reduce accumulated net total span DGD.

In addition to the application of spatial mode division multiplexing using both $LP_{01}$ mode and $LP_{11}$ mode, single mode launch into $LP_{01}$ mode is another potential application. There will be some cross talk due to distributed coupling in long distance transmission, however the small net DGD can help to reduce the spread of the distributed coupling in time domain. Few mode fibers as contemplated for the invention according to the current state of the technology generally support from 2 to 10 modes. Support in this context means that each of 2 to 10 modes are effectively transmission channels that are capable of transmitting optical signals independently without fatal crosstalk. Fatal crosstalk means that the signal is degraded beyond intelligence.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:
1. An optical fiber, comprising:
   a core and a cladding surrounding the core,
   wherein the core and cladding have a refractive index profile that is structured to support propagation of a plurality of desired signal-carrying modes, while suppressing undesired modes,
   wherein the core comprises a portion extending from the center of the core, $n_{core}$, to radius a, in which the refractive index decreases linearly from $n_{core}$ to point a,
   wherein the cladding comprises a down-doped cladding region abutting or adjacent to the core, and an undoped cladding region abutting the down-doped cladding region,
   wherein the core, and cladding are configured to support propagation of a spatially multiplexed optical signal comprising a plurality of desired modes, while suppressing undesired modes,
   wherein the core and surrounding cladding is configured such that undesired modes have respective effective indices that are close to or less than the cladding index so as to result in leaky modes that leak into the outer cladding region, and
   wherein the index spacing between the desired mode having the lowest effective index and the leaky mode with the highest effective index is sufficiently large so as to substantially prevent coupling therebetween.
2. The optical fiber of claim 1 wherein the maximum refractive index value of point a is greater than half of the value at $n_{core}$.
3. The optical fiber of claim 1 wherein the optical fiber is a Few Mode Fiber designed for 2 to 10 modes.
4. An optical fiber, comprising:
   a core and a cladding surrounding the core,
   wherein the core and cladding have a refractive index profile that is structured to support propagation of a plurality of desired signal-carrying modes, while suppressing undesired modes,
   wherein the core comprises an alpha core, wherein the cladding comprises a down-doped trench abutting or adjacent to the core, and an undoped cladding region abutting the trench, wherein the core, and cladding are configured to support propagation of a spatially multiplexed optical signal comprising a plurality of desired modes, while suppressing undesired modes, wherein the core and surrounding cladding is configured such that undesired modes have respective effective indices that are close to or less than the cladding index so as to result in leaky modes that leak into the outer cladding region, and wherein the index spacing between the desired mode having the lowest effective index and the leaky mode with the highest effective index is sufficiently large so as to substantially prevent coupling therebetween.

5. The optical fiber of claim 4 wherein the optical fiber is a Few Mode Fiber designed for 2 to 10 modes.

6. The optical fiber of claim 4 wherein the core comprises a truncated alpha core.

7. The optical fiber of claim 4 wherein the cladding comprises a ledge between the core and the trench.

8. The optical fiber of claim 4 wherein the refractive index profile has:
Truncated core radius: 5 to 20 microns
Ledge: 1 to 5 microns
Trench: 1 to 10 microns.

9. The optical fiber of claim 8 wherein the trench has a width of less than 3 microns.

* * * * *